(12) United States Patent
Okuno et al.

(10) Patent No.: US 11,040,899 B2
(45) Date of Patent: Jun. 22, 2021

(54) WATER PURIFICATION MEMBER, HYDROPONIC SYSTEM, AND WATER PURIFICATION APPARATUS

(71) Applicant: FUJIFILM BUSINESS INNOVATION CORP., Tokyo (JP)

(72) Inventors: Hiroyoshi Okuno, Kanagawa (JP); Hideaki Yoshikawa, Kanagawa (JP); Takeshi Iwanaga, Kanagawa (JP); Sakae Takeuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 132 days.

(21) Appl. No.: 16/518,301

(22) Filed: Jul. 22, 2019

(65) Prior Publication Data
US 2020/0290906 A1 Sep. 17, 2020

(30) Foreign Application Priority Data
Mar. 15, 2019 (JP) .............................. JP2019-048830

(51) Int. Cl.
| | |
|---|---|
| *C02F 1/72* | (2006.01) |
| *C02F 1/30* | (2006.01) |
| *A01G 31/02* | (2006.01) |
| *A01G 7/04* | (2006.01) |
| *B01J 35/00* | (2006.01) |

(52) U.S. Cl.
CPC .............. *C02F 1/725* (2013.01); *A01G 7/045* (2013.01); *A01G 31/02* (2013.01); *B01J 35/004* (2013.01); *C02F 1/30* (2013.01); *C02F 2201/002* (2013.01); *C02F 2305/10* (2013.01)

(58) Field of Classification Search
CPC ........ C02F 1/725; C02F 1/30; C02F 2305/10; C02F 2303/04; C02F 2201/002; C02F 2103/34; B01J 35/004; A01G 31/02; A01G 7/045; A01G 9/026
See application file for complete search history.

(56) References Cited

U.S. PATENT DOCUMENTS 8,266,840 B2   9/2012   Jung

FOREIGN PATENT DOCUMENTS

| JP | H10-249210 A | 9/1998 |
|---|---|---|
| JP | 2004-82095 A | 3/2004 |
| JP | 2004-337836 A | 12/2004 |
| JP | 2006-238717 A | 9/2006 |
| JP | 2006-320282 A | 11/2006 |
| JP | 2007-89425 A | 4/2007 |
| JP | 2010-94026 A | 4/2010 |
| JP | 2011-172539 A | 9/2011 |
| JP | 2012-6003 A | 1/2012 |
| JP | 2014-226108 A | 12/2014 |
| WO | 2015/059752 A1 | 4/2015 |

*Primary Examiner* — Lessanework Seifu
(74) *Attorney, Agent, or Firm* — Oliff PLC

(57) ABSTRACT

A water purification member includes a porous body; and photocatalyst particles loaded on the porous body and including titanium-based compound particles that have, via an oxygen atom, a surface-bonded metallic compound having a metal atom and a hydrocarbon group, that exhibit absorption at a wavelength of 500 nm in a visible absorption spectrum, and that have an absorption peak in a range of 2700 $cm^{-1}$ to 3000 $cm^{-1}$ in an infrared absorption spectrum.

22 Claims, 7 Drawing Sheets

WATER PURIFICATION MEMBER, HYDROPONIC SYSTEM, AND WATER PURIFICATION APPARATUS

CROSS-REFERENCE TO RELATED APPLICATIONS

This application is based on and claims priority under 35 USC 119 from Japanese Patent Application No. 2019-048830 filed Mar. 15, 2019.

BACKGROUND (i) Technical Field

The present disclosure relates to a water purification member, a hydroponic system, and a water purification apparatus.

(ii) Related Art

Hydroponics has been performed for producing plants such as vegetables, fruits, and flowers. In hydroponics, in order to suppress proliferation of pathogenic microorganisms in the nutrient solution, the nutrient solution is subjected to water purification.

For example, Japanese Unexamined Patent Application Publication No. 2004-082095 discloses "a method and an apparatus for treating an agricultural liquid in which the agricultural liquid is subjected to purification treatment that uses a photocatalyst-loaded member provided by coating a porous substrate with a photoreactive semiconductor containing a metal alkoxide as a photocatalyst, drying the photoreactive semiconductor to be solidified, and firing the resultant film to form a fine porous film, and that uses, as the photoreaction light for the photocatalyst, sunlight alone".

Japanese Unexamined Patent Application Publication No. 2004-337836 discloses "a photocatalytic member that includes a photocatalyst layer disposed on the surface of a porous substrate and being reactive to sunlight, that has such a porosity that light reaches inside of the photocatalytic member in the thickness direction, and that is extendable into a flat shape". In addition, this document discloses that the photocatalytic member is used for agricultural liquids.

Japanese Unexamined Patent Application Publication No. 2011-172539 discloses "a cultivation apparatus in which a nutrient solution for plant hydroponics is irradiated with light of a wavelength of 400 nm or less within a light-shielded tank having a wall coated with a photocatalyst, to sterilize the nutrient solution".

WO15/059752 discloses "a hydroponic system in which, as a growing medium of the hydroponic system, photocatalyst-loaded glass beads are used, and the photocatalyst-loaded parts are irradiated with ultraviolet radiation to prevent various germs from adhering to the growing medium".

Japanese Unexamined Patent Application Publication No. 2014-226108 discloses "a liquid purification apparatus including a light source, a light scattering device, and a photocatalytic member disposed around the light scattering device, wherein the photocatalytic member is loaded onto a carrier, and is immersed in a liquid medium".

Japanese Unexamined Patent Application Publication No. 2006-238717 discloses "a growing medium container formed by subjecting a titanium plate to a high-temperature heating treatment to form a titanium oxide coating having a surface doped with carbon in the form of Ti—C bonds".

Japanese Unexamined Patent Application Publication No. 2007-89425 discloses "a plant culture solution purification apparatus in which a photocatalyst containing apatite is added to a plant culture solution, and the photocatalyst is circulated to purify the plant culture solution".

Japanese Unexamined Patent Application Publication No. 2010-94026 discloses "a water storage apparatus in which a plant-cultivation water storage is filled with glass beads coated with visible light photocatalyst, and water is circulated to purify water".

Japanese Unexamined Patent Application Publication No. 2006-320282 discloses "a sterilization device for supplying a circulated nutrient solution, the sterilization device including a treatment tank for sterilizing an excess of a nutrient solution supplied from a nutrient solution tank to a culture bed, and a sterilization member containing an antimicrobial metallic compound constituting a photocatalyst that exhibits a sterilization effect upon irradiation with light (nonwoven fabric in which silver ions are chelated), wherein the excess of the nutrient solution is circulated between the treatment tank and the sterilization device to sterilize the excess of the nutrient solution".

Japanese Unexamined Patent Application Publication No. 10-249210 discloses "a method of sterilizing a hydroponic nutrient solution in which a photocatalyst member employed includes photocatalyst particles fixed on the surfaces of hollow glass particle substrates using an inorganic substance as a binding agent, the nutrient solution is passed through the photocatalyst member having a specific gravity adjusted so as to float and/or sink in water, and the photocatalyst member is irradiated with light containing ultraviolet radiation".

Japanese Unexamined Patent Application Publication No. 2012-6003 discloses "a water treatment method in which photocatalyst-loaded recycled foam glass having a photocatalyst loaded on recycled foam glass having a lower specific gravity than water, is floated in water being treated, and sunlight is used to efficiently decompose, sterilize, or remove organic matter or microorganisms in the water being treated.

SUMMARY

Aspects of non-limiting embodiments of the present disclosure relate to a water purification member that suppresses insolubilization of organic matter or ions in an aqueous medium and that achieves efficient sterilization and purification of the aqueous medium, compared with a water purification member having a porous body and photocatalyst particles that are titanium-based compound particles loaded on the porous body and exhibiting absorption only in the ultraviolet region.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a water purification member including a porous body; and photocatalyst particles loaded on the porous body and including titanium-based compound particles that have, via an oxygen atom, a surface-bonded metallic compound having a metal atom and a hydrocarbon group, that exhibit absorption at a wavelength of 500 nm in a visible absorption spectrum, and that have an absorption peak in a range of 2700 cm$^{-1}$ to 3000 cm$^{-1}$ in an infrared absorption spectrum.

BRIEF DESCRIPTION OF THE DRAWINGS

Exemplary embodiments of the present disclosure will be described in detail based on the following figures, wherein.

DETAILED DESCRIPTION

Figure 1:
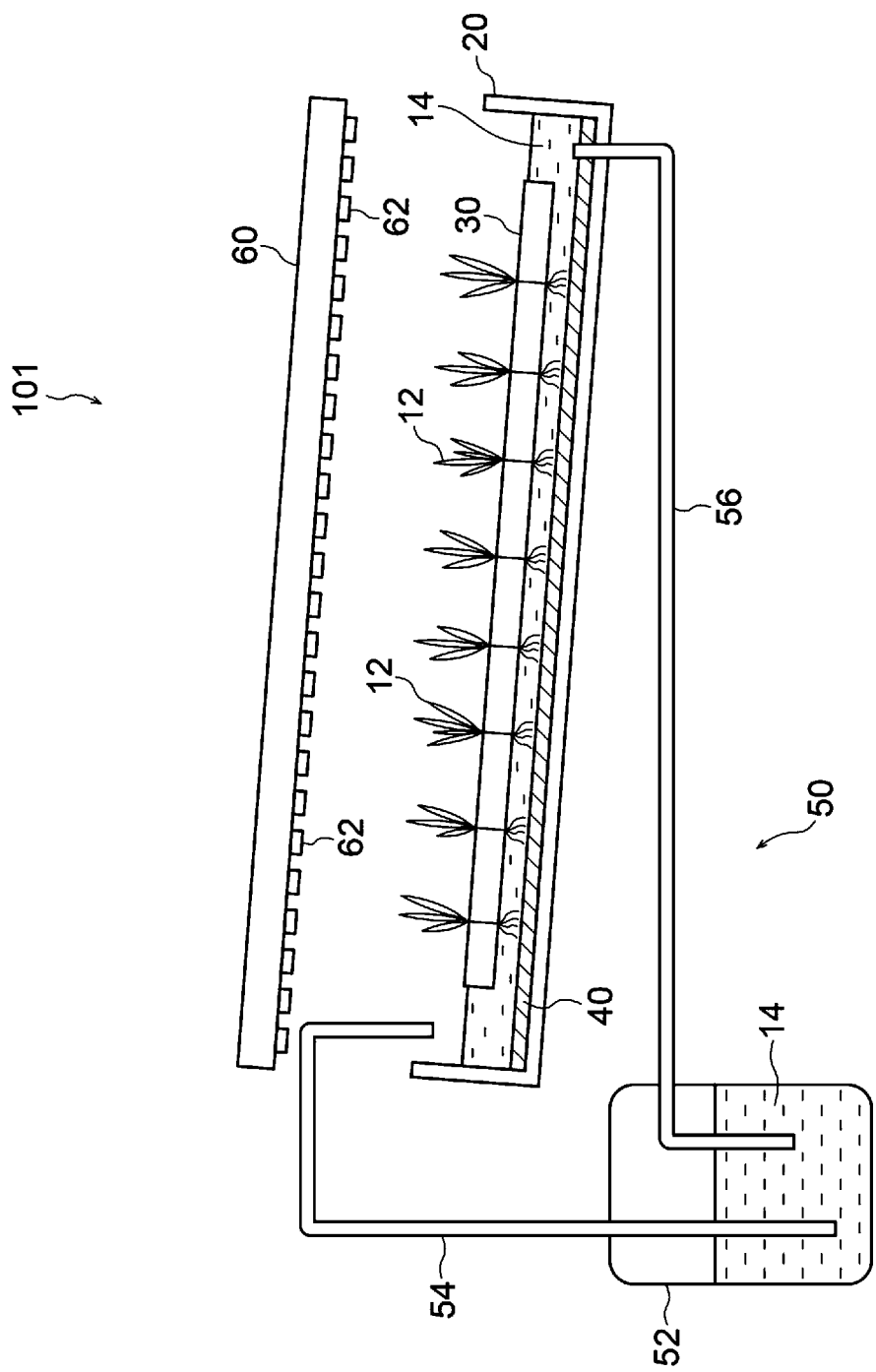
FIG. 1 is a schematic configuration view illustrating an example of a hydroponic system according to an exemplary embodiment.

Hereinafter, exemplary embodiments that are examples of the present disclosure will be described.

In this Specification, when the amount of a component of a composition is described and the composition includes plural substances belonging to the component, the amount is the total amount of the plural substances in the composition unless otherwise specified.

The term "step" means not only an independent step, but also a step that is not clearly distinguishable from another step as long as it is performed to achieve the intended purpose of the step.

"XPS" is the abbreviation of X-ray Photoelectron Spectroscopy.

Water Purification Member

The water purification member according to the exemplary embodiment includes a porous body, and photocatalyst particles loaded on the porous body.

The photocatalyst particles include titanium-based compound particles that have, via an oxygen atom, a surface-bonded metallic compound having a metal atom and a hydrocarbon group, that exhibit absorption at a wavelength of 500 nm in a visible absorption spectrum, and that have an absorption peak in a range of 2700 cm$^{-1}$ to 3000 cm$^{-1}$ in an infrared absorption spectrum (hereafter, also referred to as "specific titanium-based compound particles").

The "specific titanium-based compound particles" as photocatalyst particles have, via an oxygen atom, a surface-bonded metallic compound having a metal atom and a hydrocarbon group, exhibit absorption at a wavelength of 500 nm in a visible absorption spectrum, and have an absorption peak in a range of 2700 cm$^{-1}$ to 3000 cm$^{-1}$ in an infrared absorption spectrum, and thus provide a photocatalytic action in the visible-light region.

The water purification apparatus according to the exemplary embodiment has the above-described features, to thereby achieve, while suppressing insolubilization of organic matter or ions in the aqueous medium, efficient sterilization and purification of the aqueous medium. The mechanism of this is inferred as described below.

In these years, with the aging of agricultural producers and a decline in the agricultural population, there have been increasing expectations for plant factories that can produce, as planned and stably, high-quality and inexpensive plants (for example, foods (such as vegetables and fruits) and ornamental plants (such as flowers)).

Plant factories are roughly classified into "sunlight-use type" facilities and "complete-control type" facilities.

The "sunlight-use type" facilities are semi-closed facilities, such as glass greenhouses or vinyl greenhouses, that use sunlight, and, for example, perform supplemental lighting during rainy weather or cloudy weather, and suppress high temperatures during summer.

The "complete-control type" facilities are indoor facilities within, for example, office buildings, that use artificial light from light sources such as LEDs (Light Emitting Diodes), and perform environmental control in terms of temperature and humidity, for example.

In such facilities of both types, in general, hydroponics, which is a process of growing plants with nutrient solutions but without soil, is performed. Hydroponics is a soilless process of growing plants with nutrient solutions, and hence is less likely to undergo injury by continuous cropping. In addition, conditions such as temperature, humidity, light, nutrients, and carbon dioxide are controlled to maintain optimal environments for growth of plants, which accelerates the growth.

Thus, hydroponics enables harvesting and shipping as planned and stable in short terms without being affected by weather.

On the other hand, since hydroponics uses nutrient solutions, pathogenic microorganisms, if present, in the nutrient solutions enter plants via the nutrient solutions. In order to prevent this, interiors of the facilities, hydroponic systems, agricultural machines and implements, agricultural materials, and the like are washed and disinfected. In addition, the facilities are off-limits to any person other than the concerned; and hand washing and changing clothes during entry to the facilities are promoted.

As a result, the management for maintaining the germ-free state of nutrient solutions tends to become laborious, and the management costs tend to increase.

In order to suppress proliferation of pathogenic microorganisms in nutrient solutions (in other words, in order to sterilize and purify nutrient solutions), there are a method of adding a chemical (such as a chloride compound) to nutrient solutions, and a method of heat-sterilizing hydroponic systems, agricultural materials, and nutrient solutions, for example.

However, the chemical (such as a chloride compound) may damage roots of plants. The heat-sterilization is performed with consumption of an enormous amount of thermal energy, which results in an increase in the cultivation costs.

In order to suppress proliferation of pathogenic microorganisms in nutrient solutions (in other words, in order to sterilize and purify nutrient solutions), there are other methods: a method of using ultraviolet radiation or a photocatalyst reactive to ultraviolet radiation to sterilize and purify nutrient solutions, and a method of using a photocatalyst reactive to visible light to sterilize and purify nutrient solutions.

However, the method of using ultraviolet radiation or a photocatalyst reactive to ultraviolet radiation to sterilize and purify nutrient solutions causes strong oxidation, which tends to cause, in addition to sterilization and purification, insolubilization of organic matter or ions in the solutions. This may result in, in hydroponics, insolubilization and deactivation of nutrient components in the nutrient solutions (for example, organic matter in which iron, manganese, copper, zinc, or the like is chelated (namely, chelate metallic compounds), and ions of iron, manganese, copper, zinc, or the like).

The method of using a photocatalyst reactive to visible light to sterilize and purify nutrient solutions uses a film including the photocatalyst to sterilize and purify nutrient solutions, which is less likely to achieve efficient sterilization and purification of nutrient solutions. When a nutrient solution is sterilized and purified at low efficiency, in the case of not circulating the nutrient solution, the nutrient solution needs to be frequently replaced; alternatively, in the case of circulating the nutrient solution, the nutrient solution needs to be circulated at a lower rate, which is less likely to provide efficient growth of plants.

Thus, there has been a demand for hydroponics in which a nutrient solution is sterilized and purified efficiently while deactivation of nutrient components in the nutrient solution is suppressed.

In addition to the sterilization and purification of nutrient solutions, for water purification of, for example, water in garden ponds, water in aquariums or aquaterrariums, washing water, and hot spring water, there has been a demand for water purification in which, while insolubilization of organic matter or ions in the aqueous medium is suppressed, efficient sterilization and purification of the aqueous medium is achieved.

In order to address such demands, the water purification member according to the exemplary embodiment includes a porous body loaded with the "specific titanium-based compound particles" serving as photocatalyst particles.

These photocatalyst particles, namely, the "specific titanium-based compound particles" have, via an oxygen atom, a surface-bonded metallic compound having a metal atom and a hydrocarbon group and have a large specific surface area, hence strongly adsorb microorganisms. In addition, these photocatalyst particles are less likely to aggregate and do have high dispersibility.

The specific titanium-based compound particles also exhibit absorption at a wavelength of 500 nm in a visible absorption spectrum, and provide a strong photocatalytic action in the visible-light region. In addition, the wavelength region at and about 500 nm in a visible absorption spectrum is the wavelength region of light reflected by leaves etc. of plants (specifically, green reflected light); thus, the specific titanium-based compound particles use such reflected light from leaves etc. of plants, to provide the photocatalytic action.

Thus, the photocatalyst particles that have high dispersibility and strong adsorption, and that provide a strong photocatalytic action in the visible-light region are substantially uniformly loaded on a porous body, and provide strong adsorption for microorganisms and a strong photocatalytic action in the visible-light region.

However, the "specific titanium-based compound particles" as photocatalyst particles provide a milder oxidation action than ultraviolet radiation or a photocatalyst reactive to ultraviolet radiation. As a result, while efficient sterilization and purification is promoted, insolubilization of organic matter or ions in the aqueous medium is suppressed.

By the above-described mechanism, the water purification member according to the exemplary embodiment inferentially achieves, while suppressing insolubilization of organic matter or ions in the aqueous medium, efficient sterilization and purification of the aqueous medium.

The sterilization and purification of an aqueous medium using ultraviolet radiation or a photocatalyst reactive to ultraviolet radiation requires expensive and large-scale equipment. By contrast, sterilization and purification of an aqueous medium using the water purification member according to the exemplary embodiment employs sunlight and visible-light-containing reflected light from objects (for example, reflected light from leaves etc. of plants) to achieve sterilization and purification. Alternatively, in the case of indoor facilities within office buildings or the like, sterilization and purification of an aqueous medium is achieved using light sources such as commonly used LEDs that emit light in the visible-light region. Thus, sterilization and purification of an aqueous medium using the water purification member according to the exemplary embodiment enables a reduction in the equipment costs and a reduction in the size of equipment.

In summary, the water purification apparatus including the water purification member according to the exemplary embodiment achieves, while suppressing insolubilization of organic matter or ions in the aqueous medium, efficient sterilization and purification of the aqueous medium, in addition, achieves a reduction in the equipment costs and a reduction in the size of equipment.

Thus, a hydroponic system including the water purification member according to the exemplary embodiment achieves, while suppressing deactivation of nutrient components in the nutrient solution, efficient sterilization and purification of the nutrient solution.

Thus, in the case of not circulating the nutrient solution, the number of replacing the nutrient solution is reduced; alternatively, in the case of circulating the nutrient solution, the nutrient solution is circulated at an increased rate to achieve efficient growth of plants. In addition, compared with ultraviolet radiation or a photocatalyst reactive to ultraviolet radiation, a mild oxidation action due to a photocatalyst reactive to visible light is employed to achieve sterilization and purification of the nutrient solution, which results in suppression of damage on the roots of plants. In this regard, efficient growth of plants is also achieved.

In addition, the hydroponic system including the water purification member according to the exemplary embodiment achieves a reduction in the system costs and a reduction in the size of the system.

Hereinafter, the exemplary embodiment will be described in detail with reference to drawings. Some parts that have substantially the same function may be denoted by the same reference sign throughout several drawings, and redundant descriptions may be omitted.

Hydroponic System

A hydroponic system 101 according to the exemplary embodiment includes, for example, as illustrated in FIG. 1, a container 20, which holds a nutrient solution 14, which contains nutrients for plants 12; a growing medium member 30, in which the plants 12 grow; a water purification member 40, which is disposed so as to be in contact with the nutrient solution 14 and exposed to visible light; a circulation device 50, which circulates the nutrient solution held in the container 20; and a light radiation device 60, which radiates visible light to at least the water purification member 40.

The hydroponic system 101 is, for example, a nutrient film technique (NFT) hydroponic system. Alternatively, the hydroponic system 101 may be a deep flow technique (DFT) hydroponic system.

In the hydroponic system 101, the apparatus including the container 20, the growing medium member 30, the water purification member 40, the circulation device 50, and the light radiation device 60 is an example of the water purification apparatus.

However, the circulation device 50 and the light radiation device 60 are optionally installed.

Nutrient Solution

The nutrient solution is, for example, an aqueous solution including nutrients for the plants 12. Examples of the nutrients for the plants 12 include nitrogen, phosphorus, potassium, calcium, magnesium, sulfur, boron, iron, manganese, zinc, and molybdenum. Examples of the nutrients for the plants 12 include inorganic nutrients containing such elements and organic nutrients containing such elements.

In the nutrient solution, the composition of nutrients for the plants 12 is selected in accordance with the plants 12 for growth and the growth state of the plants 12.

Examples of the inorganic nutrients include well-known nutrients such as potassium nitrate, calcium nitrate, sodium nitrate, urea, ammonium sulfate, ammonium chloride, ammonium phosphate, potassium phosphate, potassium chloride, potassium sulfate, monocalcium phosphate, calcium chloride, magnesium sulfate, ferrous sulfate, ferric chloride, boric acid, sodium borate, manganese sulfate, manganese chloride, zinc sulfate, zinc chloride, copper sulfate, ammonium molybdate, and sodium molybdate.

Examples of the organic nutrients include well-known nutrients such as organic matter in which iron, manganese, copper, zinc, or the like is chelated (namely, chelate metallic compounds). Examples of the chelating agent include well-known chelating agents such as ethylenediaminetetraacetic acid (EDTA), diethylenetriamine-N,N,N',N'',N''-pentaacetic acid (DTPA), and ethylenediamine-di(o-hydroxyphenylacetic acid) (EDDHA).

In particular, the hydroponic system 101 enables suppression of insolubilization of nutrient components in the nutrient solution, and suppression of deactivation of nutrients. Thus, even when the nutrient solution contains nutrients that tend to be insolubilized by ultraviolet radiation or a photocatalyst reactive to ultraviolet radiation (for example, organic nutrients in which iron, manganese, copper, zinc, or the like is chelated (namely, chelate metallic compounds), and inorganic nutrients containing iron, manganese, copper, zinc, or the like), insolubilization of these nutrients is suppressed.

Container

Container 20

In the hydroponic system 101, the container 20 is, for example, an open-top box-shaped tub.

To the bottom of the container 20, a discharge pipe 56 of the circulation device 50 is connected. Alternatively, to a side wall of the container 20, the discharge pipe 56 of the circulation device 50 may be connected.

The container 20 may be constituted by a single tub, for example. Alternatively, the container 20 may be constituted by plural tubs.

Growing Medium Member

The growing medium member 30 is, for example, a plate-shaped member that supports the roots of the plants 12 being grown. The growing medium member 30 may be a member that holds the entirety or portions of the roots of the plants 12, or may be a member that does not hold the roots of the plants 12. The shape of the growing medium member 30 is not particularly limited, and may be cubic, for example.

The growing medium member 30 is disposed such that the roots of the plants 12 being grown are in contact with the nutrient solution 14 in the container 20. Specifically, the growing medium member 30 is disposed in contact with the nutrient solution 14 in the container 20. Alternatively, the growing medium member 30 may be disposed not in contact with the nutrient solution 14 as long as the roots of the plants 12 are in contact with the nutrient solution 14 in the container 20.

The growing medium member 30 includes, for example, support parts 32, which support the plants 12, and a holder part 34, which holds the support parts 32.

Figure 2:
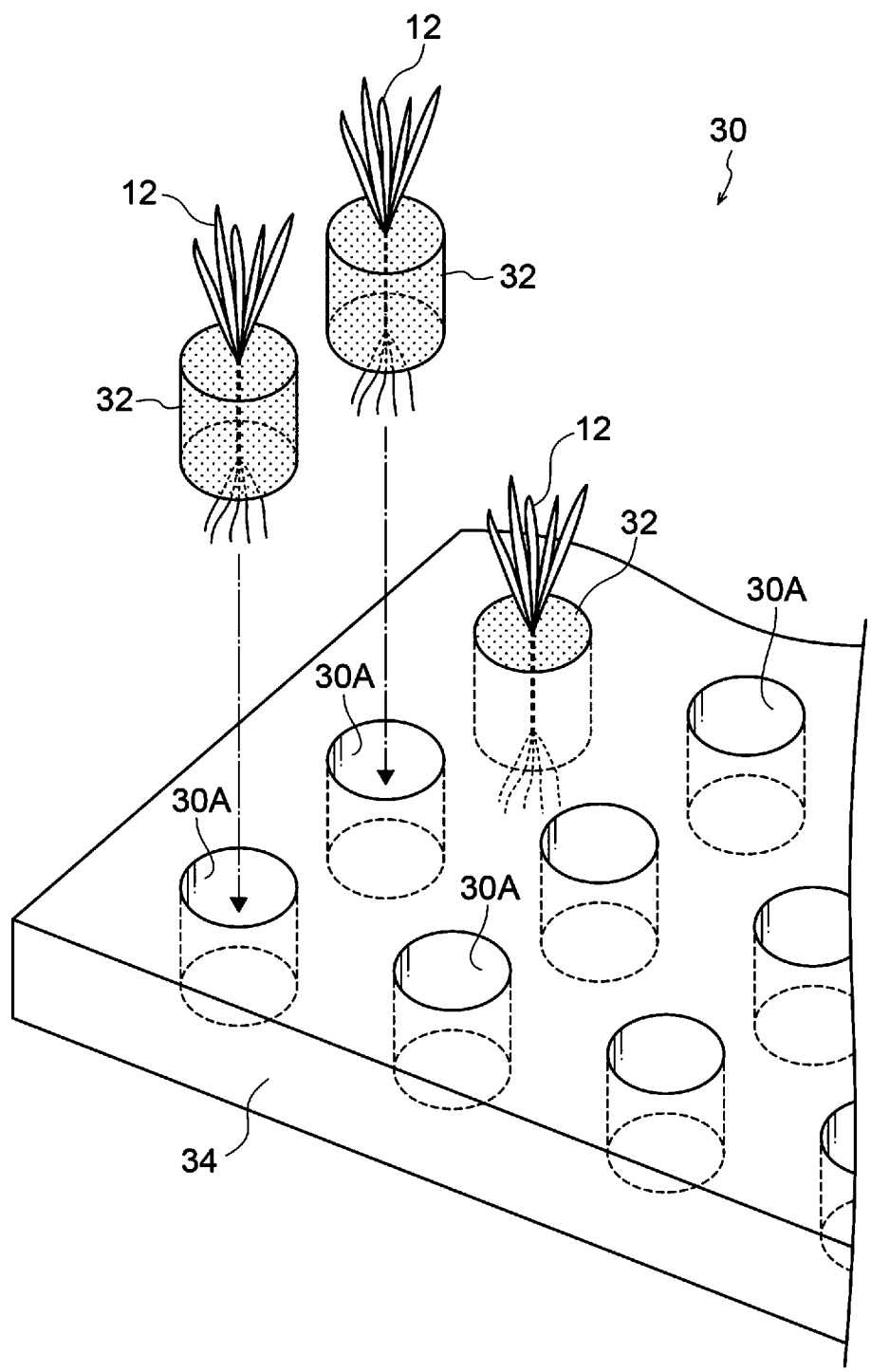
FIG. 2 is a schematic configuration view illustrating an example of a growing medium member in the hydroponic system according to the exemplary embodiment.

The support parts 32 and the holder part 34 may be provided as separate parts, for example (refer to FIG. 2). FIG. 2 illustrates openings 30A, which are formed in the holder part 34 in order to insert and hold the support parts 32.

Figure 3:
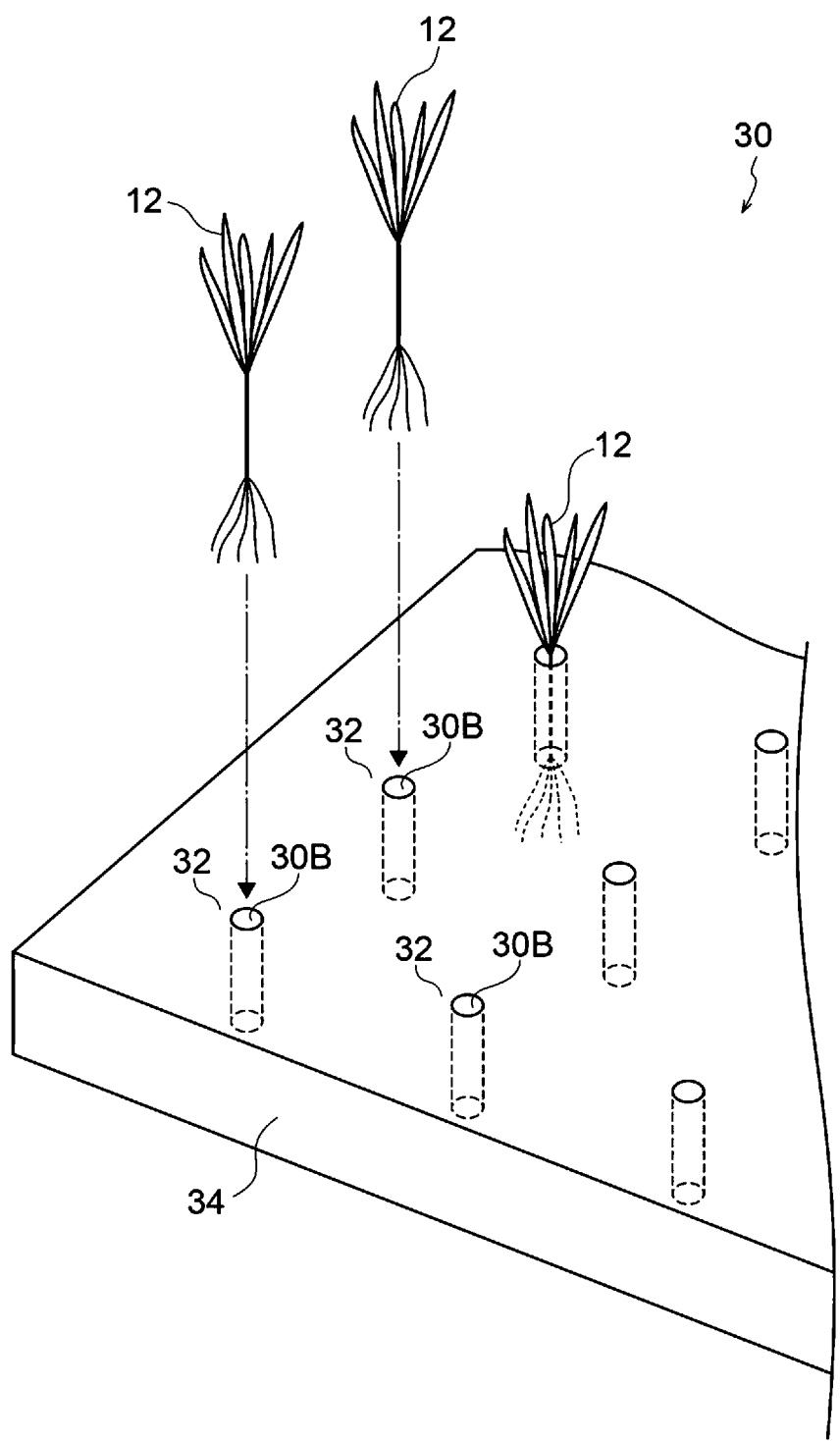
FIG. 3 is a schematic configuration view illustrating another example of the growing medium member in the hydroponic system according to the exemplary embodiment.

Alternatively, the support parts 32 and the holder part 34 may be provided as a single-piece member (refer to FIG. 3). FIG. 3 illustrates holes 30B, which are formed in order to insert and hold the plants 12.

The growing medium member 30 transmits visible light, for example.

In particular, in the container 20, when the water purification member 40 is disposed such that all or a portion thereof is overlapped by the growing medium member 30 when viewed in the depth direction of the container 20, the growing medium member 30 may transmit visible light. In this case, visible light reaches, via the growing medium member 30, even the portion of the water purification member 40 overlapped by the growing medium member 30. This facilitates efficient sterilization and purification of the nutrient solution.

Specifically, the growing medium member 30 preferably has a visible-light transmittance of 30% or more, more preferably 30% or more and 95% or less, still more preferably 50% or more and 90% or less.

The visible-light transmittance of the growing medium member 30 is measured in the following manner: a total luminous transmittance (%) is measured in accordance with JIS K7361-1:1997, using a haze meter (NDH-2000, manufactured by NIPPON DENSHOKU INDUSTRIES CO., LTD.).

Alternatively, when the water purification member 40 is disposed such that all or a portion thereof is not overlapped by the growing medium member 30 when viewed in the depth direction of the container 20, the growing medium member 30 may not transmit visible light.

Water Purification Member 40

The water purification member 40 is constituted by a plate-shaped member, for example. The water purification member 40 is disposed, for example, so as to be immersed, over the whole bottom surface of the container 20, in the nutrient solution 14 in the container 20. Thus, the water purification member 40 is disposed such that a portion thereof is not overlapped by the growing medium member 30 when viewed in the depth direction of the container 20.

The shape of the water purification member 40 is not particularly limited, and may be hollow cylindrical, columnar, or cubic, for example.

The position at which the water purification member 40 is disposed is not particularly limited as long as the water purification member 40 is disposed so as to be in contact with the nutrient solution 14 and exposed to visible light. Examples of such a positional configuration of the water purification member 40 are as follows.

1) a configuration in which the water purification member 40 is disposed such that all of it is not overlapped by the growing medium member 30 when viewed in the depth direction of the container 20

2) a configuration in which the water purification member 40 is disposed such that all of it is overlapped by the growing medium member 30 when viewed in the depth direction of the container 20 (provided that, for example, the growing medium member 30 employed is a member that transmits visible light, or a light radiation device that irradiates the water purification member 40 with visible light is disposed)

3) a configuration in which the water purification member 40 is disposed so as to float over the nutrient solution 14 around the growing medium member 30

4) a configuration in which the water purification member 40 is disposed in contact with the nutrient solution 14 within a storage tank 52 in the circulation device 50 (provided that, for example, the storage tank 52 employed is a tank that transmits visible light, or a light radiation device that irradiates the water purification member 40 within the storage tank 52 with visible light is disposed)

Other details of the water purification member 40 will be described later.

Circulation Device

The circulation device 50 includes, for example, the storage tank 52, which stores the nutrient solution 14; a supply pipe 54, which supplies the nutrient solution 14 from the storage tank 52 to the container 20; and a discharge pipe 56, which discharges the nutrient solution 14 from the container 20 to the storage tank 52.

The supply pipe 54 has, for example, one end connected to the storage tank 52, and the other end disposed at a position so as to supply the nutrient solution 14 to the container 20 (for example, a position above one end of the container 20). The supply pipe 54 has, for example, a pump and a valve (not shown) at intermediate positions.

The discharge pipe 56 has, for example, one end connected to the storage tank 52, and the other end disposed at a position so as to discharge the nutrient solution 14 from the container 20 (for example, the bottom portion or side wall portion of the container 20 at an end of the container 20, the end being the other end relative to the one end of the container 20 above which the other end of the supply pipe 54 is disposed). The discharge pipe 56 has, for example, a pump and a valve (not shown) at intermediate positions.

From the viewpoint of efficient sterilization and purification of the nutrient solution, the flow rate of the nutrient solution 14 flowing through the water purification member 40, the flow rate being calculated from the supply amount per unit time (L/min (liter/minute)) of the nutrient solution 14 supplied by the circulation device 50 to the container 20, and the volume of the water purification member 40 (width× length×thickness, unit: m$^3$), is preferably calculated to be 500 L/min/m$^3$ or more and 200000 L/min/m$^3$ or less, more preferably 1000 L/min/m$^3$ or more and 100000 L/min/m$^3$ or less, still more preferably 5000 L/min/m$^3$ or more and 60000 L/min/m$^3$ or less.

The flow rate of the nutrient solution 14 flowing through the water purification member 40 is calculated in the following manner.

Flow rate (L/min/m$^3$) of nutrient solution flowing through water purification member=Supply amount per unit time (L/min) of nutrient solution/Volume (m$^3$) of water purification member The circulation device 50 is not particularly limited as long as it circulates the nutrient solution 14 held in the container 20. For example, the circulation device 50 may be device having a well-known configuration in which one of the supply and drainage of the nutrient solution 14 in the container 20 is achieved by gravity flow, and the other is achieved using a liquid sending unit such as a pump.

Light Radiation Device

The light radiation device 60 is, for example, a device that radiates visible light to the plants 12 being grown and the water purification member 40 (for example, a device whose light radiation part is disposed above the container 20).

The light radiation device 60 is a device that radiates visible light to at least the water purification member 40. However, when the hydroponic system 101 is disposed indoors where sunlight does not reach or is less likely to reach, the light radiation device 60 may be a device that radiates visible light to the plants 12 and the water purification member 40.

The light radiation device 60 includes a light source 62, which emits visible light. Examples of the light source 62 include an LED (Light Emitting Diode) unit, a laser unit, and a fluorescent lamp.

In the case of radiating visible light to the water purification member 40 alone, the light source 62 at least radiates visible light of a wavelength region including "the wavelength of 500 nm in a visible absorption spectrum", which is absorbed by at least the photocatalyst particles (titanium-based compound particles) of the water purification member 40.

Alternatively, in the case of radiating visible light to the water purification member 40 and the plants 12, the light source 62 may radiate visible light of the wavelength region covering the whole visible-light region (for example, wavelengths of 360 nm or more and 830 nm or less).

The light radiation device 60 is not particularly limited as long as it radiates visible light to at least the water purification member 40. The light radiation device 60 may be a well-known device such as a device of radiating visible light emitted from the light source 62, via a reflective plate or an optical waveguide (such as an optical fiber), to the water purification member 40; or a device of diffusely reflecting visible light emitted from the light source 62, and radiating the resultant light to the water purification member 40.

The hydroponic system 101 according to the exemplary embodiment having been described so far includes the water purification member 40, to thereby achieve, while suppressing deactivation of nutrient components in the nutrient solution, efficient sterilization and purification of the nutrient solution.

The hydroponic system 101 according to the exemplary embodiment is not limited to the above-described configuration, and is applicable to various well-known hydroponic systems. For example, the hydroponic system 101 according to the exemplary embodiment is applicable to the following systems:

1) a system of not circulating the nutrient solution 14;

2) a system of supplying a concentrate of the nutrient solution 14 to the nutrient solution 14 in the container 20 or in the storage tank 52 of the circulation device; and 3) a system of supplying oxygen to the nutrient solution 14 in the container 20 or in the storage tank 52 of the circulation device.

In the hydroponic system 101 according to the exemplary embodiment, the water purification apparatus (for example, the apparatus including the container 20, the growing medium member 30, the water purification member 40, the circulation device 50, and the light radiation device 60) is also applicable to systems other than the hydroponic system 101.

For example, the water purification apparatus is applicable to 1) systems of purifying the water of garden ponds, and 2) systems of sterilizing the water of aquariums or aquaterrariums, washing water, or hot spring water, for example.

The water purification apparatus includes the water purification member 40, to thereby achieve, while suppressing insolubilization of organic matter or ions in the aqueous medium, efficient sterilization and purification of the aqueous medium.

Water Purification Member

Hereinafter, the water purification member applied to the hydroponic system and water purification apparatus according to the exemplary embodiment (hereafter, also referred to as "the water purification member according to the exemplary embodiment") will be described in detail.

The water purification member according to the exemplary embodiment includes a porous body, and photocatalyst particles loaded on the porous body.

Porous Body

The porous body is a member that is loaded with the photocatalyst particles and that has liquid permeability.

The porous body may be a flexible member or a rigid member. In other words, the porous body may or may not support itself.

The porous body (at least the surface of the porous body) may be hydrophilic or hydrophobic. The porous body is preferably hydrophilic from the viewpoint of providing improved affinity for the aqueous medium to be purified (for example, a nutrient solution) to facilitate efficient sterilization and purification of the aqueous medium (for example, efficient sterilization and purification of the nutrient solution).

The term "hydrophilic" is a property of having a high affinity for water and being easily wet with water. The degree of hydrophilicity is indicated with a contact angle of water (hereafter, also simply referred to as "water contact angle").

When a measurement target has hydrophilicity, the surface of the measurement target preferably has a contact angle of water of 90° or less, more preferably 60° or less, most preferably 30° or less. The water contact angle is, with water dropped onto the surface of a measurement target, the angle between the surface and the liquid surface. When this angle is large, the measurement target is less likely to be wet with water. When the angle is small, the measurement target is easily wet with water.

The water contact angle is measured with a goniometer, for example. Specifically, in an environment at 23° C. and 55% RH, water is dropped onto the surface of a measurement target, left for 60 seconds, and then the contact angle is measured with a contact angle meter CA-X (manufactured by Kyowa Interface Science Co., Ltd.).

When water enters pores of a porous body serving as the measurement target, this water-permeated porous body is measured for the contact angle.

The porous body has an average pore size in a range of 0.5 µm or more and 100 µm or less, which is, for example, larger than the size of the photocatalyst particles.

Specifically, the porous body preferably has an average pore size of 1 µm or more and 50 µm or less, more preferably 1.5 µm or more and 30 µm or less.

The average pore size of the porous body is measured in the following manner.

The porous body is observed with a scanning electron microscope (S-4100, manufactured by Hitachi, Ltd.) and an image is captured. At this time, the magnification of the scanning electron microscope is adjusted so that plural pores of the porous body are observed, and an image is captured; and the average pore size is measured.

When the porous body is constituted by a porous body of, for example, metal, glass, or ceramic, the pores have an elliptical shape or an indefinite shape; in this case, the lengths of the pores (namely, the maximum sizes) are determined as pore sizes.

Alternatively, when the porous body is formed of, for example, a fibrous material such as paper, nonwoven fabric, or woven fabric, the pores are holes formed among overlapping fibers; in this case, the lengths of the holes (namely, the maximum sizes) are determined as pore sizes.

In this way, 10 to 50 pore sizes are measured and averaged to determine the average pore size.

The average pore size of the porous body is the average pore size of the material forming the porous body.

Examples of the material forming the porous body include fibrous materials, resin porous bodies (such as resin porous films (for example, membranes) and sponges), metal porous bodies, glass porous bodies, and ceramic porous bodies.

Examples of the fibrous materials include woven fabric, knit fabric, nonwoven fabric, and paper.

Examples of the fibers include natural fibers (such as cotton, silk, hemp, wool, and pulp), and synthetic fibers (such as nylon fibers, polyester fibers, acrylic fibers, polyurethane fibers, polyolefin fibers, cellulose fibers, and vinyl alcohol fibers).

Of these, preferred are fibers to which the photocatalyst particles easily adhere: specifically polyolefin fibers (such as polyethylene fibers, and polypropylene fibers), polyester fibers (such as polyester terephthalate fibers), cellulose fibers (cellulose triacetate fibers, and cellulose diacetate fibers), and polyvinyl alcohol fibers (such as ethylene-vinyl alcohol fibers).

Other preferred examples of the fibers to which the photocatalyst particles easily adhere include core-sheath composite fibers having core portions and sheath portions surrounding the core portions. The core portions may be formed of a hydrophobic high-melting-point resin (such as a polypropylene resin, a polyester resin, or a cellulose resin). The sheath portions may be formed of a hydrophilic low-melting-point resin (having a lower melting point than the resin of the core portions) (such as a polyethylene resin or a polyvinyl alcohol resin (for example, an ethylene-vinyl alcohol copolymer resin)).

Examples of the resin porous bodies include resin porous films (for example, membranes) formed of, for example, polystyrene (PS), polyvinylidene fluoride (PVDF), polytetrafluoroethylene (PTFE), or polyethersulfone; and sponges formed of, for example, urethane or polypropylene.

Examples of the paper include various paper materials such as woodfree paper formed from 100% virgin pulp; recycled paper formed from 100% recycled pulp; paper materials formed from mixtures of virgin pulp and recycled pulp mixed in desired ratios; paper materials having varied ratios of NBKP to LBKP; paper materials formed from plant fiber materials other than wood pulp, such as kenaf and bamboo; and clay-coated paper. Other examples of the paper include paper formed so as to contain filler such as calcium carbonate in order to provide improved whiteness, opacity, or smoothness, and paper formed so as to contain a resin such as polyacrylamide or epoxy-modified polyamide in order to provide improved flexibility or strength.

Examples of the metal porous bodies include metal porous bodies formed of a metal such as SUS, aluminum, or nickel, or a sintered alloy.

Examples of the glass porous bodies include glass porous bodies formed by sintering a spherical quartz glass powder.

Examples of the ceramic porous bodies include ceramic porous bodies formed by sintering ceramic such as alumina or zirconia.

In particular, from the viewpoint of efficient sterilization and purification of an aqueous medium (for example, efficient sterilization and purification of a nutrient solution), the material forming the porous body is preferably a fibrous material. In other words, the porous body is preferably formed of fibers.

Hereafter, such a porous body formed of fibers is also referred to as a "fibrous porous body".

The fibers forming the fibrous porous body preferably have an average breadth (namely, average fiber breadth) of, from the viewpoint of, for example, liquid permeability, flexibility, rigidity, and holdability of the photocatalyst particles, 0.5 µm or more and 100 µm or less, more preferably 1 µm or more and 50 µm or less.

The fibers forming the fibrous porous body preferably have an average length (namely, average fiber length) of, from the viewpoint of, for example, liquid permeability, flexibility, rigidity, and holdability of the photocatalyst particles, 0.5 mm or more and 200 mm or less, preferably 1 mm or more and 100 mm or less.

The average fiber breadth and average fiber length of fibers forming the porous body are determined in the following manner: an electron microscope is used to observe 20 fibers and measure the fiber breadths (maximum breadths) and fiber lengths of the fibers, and the measured values are averaged to determine the average values.

The fibrous porous body preferably has a grammage of, from the viewpoint of, for example, liquid permeability, flexibility, rigidity, and holdability of the photocatalyst particles, 10 g/m$^2$ or more and 500 g/m$^2$ or less, more preferably 30 g/m$^2$ or more and 300 g/m$^2$ or less, still more preferably 50 g/m$^2$ or more and 200 g/m$^2$ or less.

The grammage of the fibrous porous body is measured in accordance with JIS P8124 (2011).

The fibrous porous body preferably has a thickness of, from the viewpoint of efficient sterilization and purification of an aqueous medium (for example, efficient sterilization and purification of a nutrient solution), 0.05 mm or more and 10 mm or less, preferably 0.1 mm or more and 5 mm or less.

The porous body may be provided by stacking several porous bodies satisfying a preferred range of visible-light transmittance described later, so as to have a thickness satisfying the above-described thickness range.

The shape of the porous body is not particularly limited, and may be a well-known shape such as a plate, a solid cylinder, a hollow cylinder, a solid prism, or a hollow prism.

The porous body may have a honeycomb structure formed of one of the above-described materials for forming the porous body.

FIG. 1 illustrates a plate-like porous body (namely, a water purification member). The water purification member has the same shape as the porous body.

Photocatalyst Particles

Figure 4:
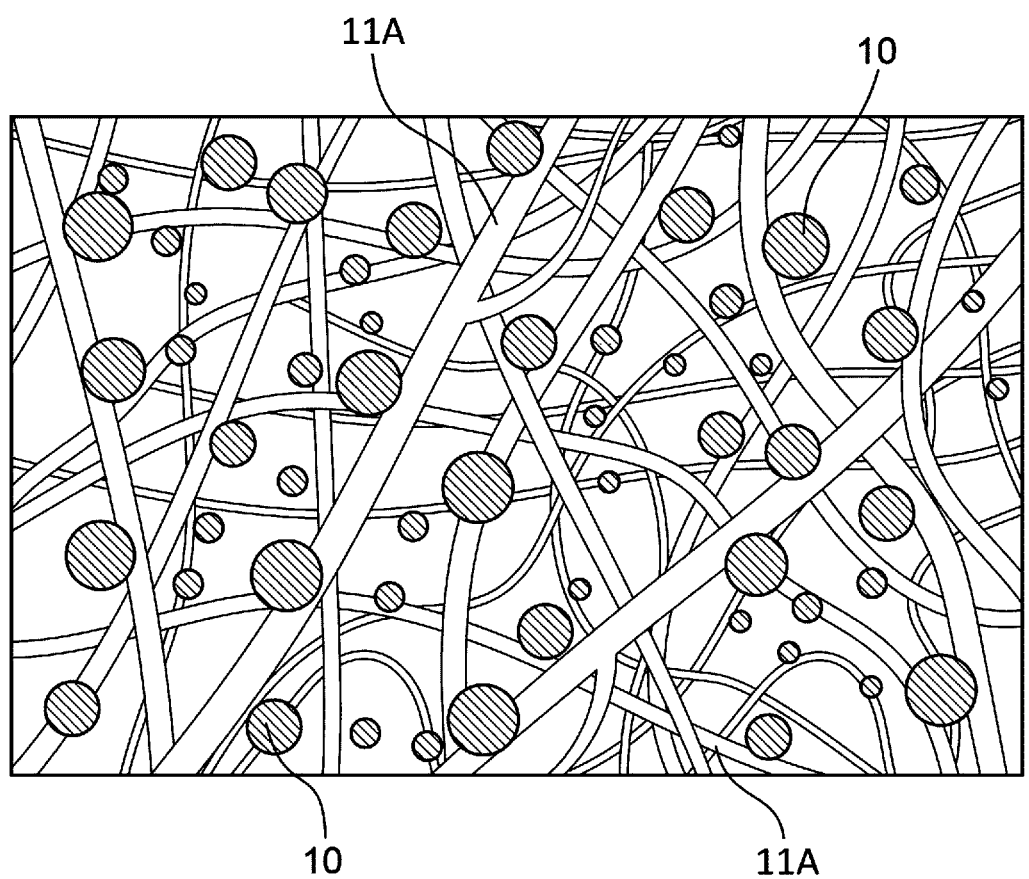
FIG. 4 is a schematic enlarged view illustrating an example of the state of adhesion of photocatalyst particles in a water purification member according to an exemplary embodiment.

The photocatalyst particles are included in the water purification member so as to be loaded on the inner walls of pores of the porous body (loaded on fibers when the porous body is formed of fibers) (refer to FIG. 4).

Figure 5:
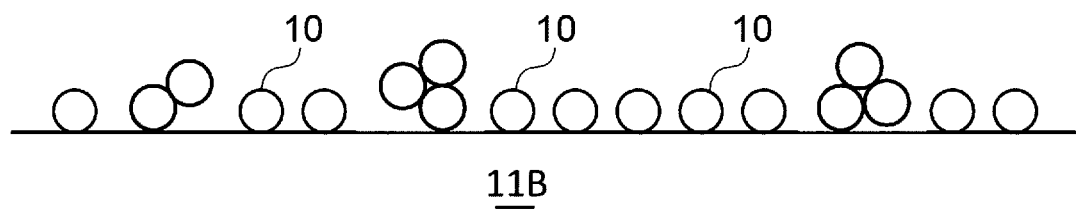
FIG. 5 is a schematic configuration view illustrating the state of adhesion of photocatalyst particles in the water purification member according to the exemplary embodiment.

When the photocatalyst particles are, for example, metatitanic acid particles or titanium oxide particles, the photocatalyst particles are included, in the water purification member 40, as primary particles or aggregate particles of primary particles (refer to FIG. 5).

Figure 6:
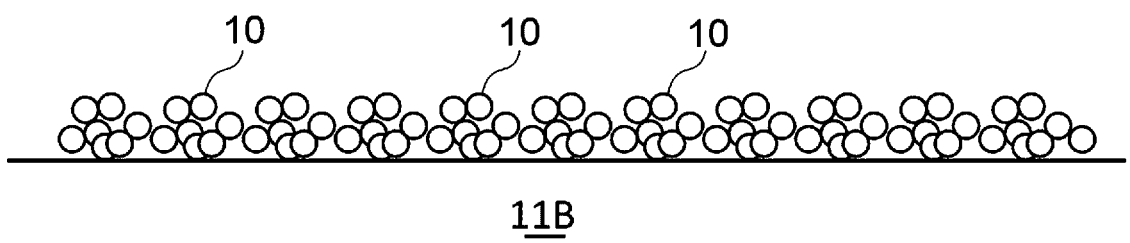
FIG. 6 is a schematic configuration view illustrating the state of adhesion of photocatalyst particles in the water purification member according to the exemplary embodiment.

Alternatively, when the photocatalyst particles are, for example, titanium oxide aerogel particles or silica-titania composite aerogel particles, the photocatalyst particles are included, in the water purification member 40, as an aggregate having an aerogel structure (refer to FIG. 6). The "aerogel structure" is a porous aggregate of primary particles that has a cluster structure composed of particulates having sizes on the order of nanometers, and that has an internal three-dimensional-network fine structure.

FIG. 4 to FIG. 6 illustrate configurations in which photocatalyst particles are loaded on porous bodies. FIG. 4 illustrates a configuration in which photocatalyst particles are loaded on a fibrous porous body serving as a porous body.

FIG. 4 to FIG. 6 illustrate photocatalyst particles 10, fibers 11A of the fibrous porous body, and inner walls 11B of pores of the porous body (fibers 11B when the porous body is a fibrous porous body).

Hereinafter, the photocatalyst particles will be described in detail where reference signs are omitted.

The photocatalyst particles exhibit absorption at a wavelength of 500 nm in a visible absorption spectrum, and has an absorption peak in a range of 2700 cm$^{-1}$ to 3000 cm$^{-1}$ in an infrared absorption spectrum. As a result, the photocatalyst particles provide a strong photocatalytic action upon exposure to visible light.

Specifically, the photocatalyst particles are titanium-based compound particles that have, via an oxygen atom, a surface-bonded metallic compound having a metal atom and a hydrocarbon group (the metallic compound is bonded, via an oxygen atom, to the surfaces of titanium-based compound particles).

The particles that have, via an oxygen atom, a surface-bonded metallic compound having a metal atom and a hydrocarbon group are obtained by, for example, subjecting untreated particles (for example, untreated metatitanic acid particles, untreated titanium oxide particles, untreated titanium oxide aerogel particles, or untreated silica-titania composite aerogel particles) to a surface treatment using a metallic compound having a hydrocarbon group, subsequently to a heat treatment to oxidize at least partially the hydrocarbon group so as to have a C—O bond or a C=O bond. On the surfaces of the particles, the presence of such a covalently bonded sequence of an organometallic compound having an appropriately oxidized carbon atom, an oxygen atom, and a titanium atom (or a silicon atom) inferentially causes, though the specific mechanism is not found, the particle surfaces to absorb light of a wavelength of 500 nm, so that the particles provide a visible-light photocatalytic action (visible-light response).

Hereafter, the metallic compound having a metal atom and a hydrocarbon group will be also simply referred to as the "organometallic compound".

The photocatalyst particles, which provide a strong photocatalytic action also in the visible-light region, additionally have the following advantages.

In general, untreated particles (for example, untreated metatitanic acid particles, untreated titanium oxide particles, untreated titanium oxide aerogel particles, or untreated silica-titania composite aerogel particles) have high hydrophilicity and tend to aggregate, hence tend to have low dispersibility in and low adhesion to porous bodies.

By contrast, the photocatalyst particles having, on the surfaces, hydrocarbon groups derived from an organometallic compound, have higher hydrophobicity, hence have higher dispersibility in and higher adhesion to porous bodies. Thus, the photocatalyst particles are substantially uniformly loaded on the surface of such a porous body. In addition, the photocatalyst particles are less likely to leave from the porous body.

Untreated Particles

Examples of the particles (untreated particles) to be surface-treated with an organometallic compound include untreated titanium-based compound particles. Preferred examples of the untreated titanium-based compound particles include untreated metatitanic acid particles, untreated titanium oxide particles, untreated titanium oxide aerogel particles, and untreated silica-titania composite aerogel particles. Of these, from the viewpoint of improved adhesion to porous bodies, preferred are untreated metatitanic acid particles.

In other words, the photocatalyst particles are preferably at least one particle species selected from the group consisting of metatitanic acid particles, titanium oxide particles, titanium oxide aerogel particles, and silica-titania composite aerogel particles. Of these, preferred are metatitanic acid particles.

When photocatalyst particles that are an aggregate having an aerogel structure are caused to adhere to the surface of a porous body, the untreated titanium-based compound particles are preferably untreated titanium oxide aerogel particles and/or untreated silica-titania composite aerogel particles.

Untreated Metatitanic Acid Particles

The untreated metatitanic acid particles are titanic acid particles of titanic acid hydrate $TiO_2 \cdot nH_2O$ where n=1.

The method for producing untreated metatitanic acid particles is not particularly limited, and may be a chloride process (gas phase process) or sulfate process (liquid phase process). Preferred is the sulfate process (liquid phase process).

The sulfate process (liquid phase process) is, for example, as follows. The raw material that is ilmenite ore ($FeTiO_3$) or titanium slag is dissolved in concentrated sulfuric acid to remove impurities that are iron components by being turned into iron sulfate ($FeSO_4$), to thereby provide, as an intermediate, titanium oxysulfate ($TiOSO_4$) (titanyl sulfate solution). Subsequently, the titanium oxysulfate ($TiOSO_4$) is hydrolyzed to provide untreated metatitanic acid [titanium oxyhydroxide ($TiO(OH)_2$)] particles.

The untreated metatitanic acid particles preferably have a BET specific surface area of, from the viewpoint of providing a strong photocatalytic action, 50 $m^2/g$ or more and 300 $m^2/g$ or less, more preferably 80 $m^2/g$ or more and 280 $m^2/g$ or less, still more preferably 120 $m^2/g$ or more and 250 $m^2/g$ or less. The BET specific surface area of metatitanic acid particles is determined by a gas adsorption method using nitrogen gas.

Untreated Titanium Oxide Particles

Examples of the untreated titanium oxide particles include titanium oxide particles in the form of brookite, anatase, rutile, or the like. The titanium oxide particles may have a single-crystal structure of brookite, anatase, rutile, or the like, or a mixed crystal structure of a combination of crystal forms selected from the foregoing.

The method for producing the untreated titanium oxide particles is not particularly limited, and is, for example, a chloride process (gas phase process) or a sulfate process (liquid phase process).

The untreated titanium oxide particles preferably have a BET specific surface area of, from the viewpoint of providing a strong photocatalytic action, 20 $m^2/g$ or more and 250 $m^2/g$ or less, more preferably 50 $m^2/g$ or more and 200 $m^2/g$ or less, still more preferably 80 $m^2/g$ or more and 180 $m^2/g$ or less. The BET specific surface area of the titanium oxide particles is determined by a gas adsorption method using nitrogen gas.

Untreated Titanium Oxide Aerogel Particles

The untreated titanium oxide aerogel particles may be produced by a sol-gel process using titanium alkoxide as the raw material.

The untreated titanium oxide aerogel particles may be composed of a hydrolysis-condensation product of titanium alkoxide. However, the particles may have some unreacted alkoxy groups of titanium alkoxide.

The untreated titanium oxide aerogel particles preferably have a BET specific surface area of, from the viewpoint of providing a strong photocatalytic action, 120 $m^2/g$ or more and 1000 $m^2/g$ or less, more preferably 150 $m^2/g$ or more and 900 $m^2/g$ or less, still more preferably 180 $m^2/g$ or more and 800 $m^2/g$ or less. The BET specific surface area of the titanium oxide aerogel particles is determined by a gas adsorption method using nitrogen gas.

Hereinafter, the method for producing the untreated titanium oxide aerogel particles will be described.

The method for producing the untreated titanium oxide aerogel particles may include at least the following steps (1) and (2):

(1) a step of forming porous particles containing titanium oxide by a sol-gel process to prepare a dispersion liquid containing the porous particles and a solvent (dispersion liquid preparation step), and (2) a step of using supercritical carbon dioxide to remove the solvent from the dispersion liquid (solvent removal step).

(1) Dispersion Liquid Preparation Step

The dispersion liquid preparation step is, for example, a step of causing reactions (hydrolysis and condensation) of titanium alkoxide as the raw material to form titanium oxide, to thereby obtain a dispersion liquid in which porous particles containing titanium oxide are dispersed in a solvent.

Specifically, the dispersion liquid preparation step is, for example, the following step.

Titanium alkoxide is added to alcohol. To this under stirring, an acid aqueous solution is dropped to cause titanium alkoxide to react to form titanium oxide. This provides a dispersion liquid (porous particle dispersion liquid) in which porous particles containing titanium oxide are dispersed in the alcohol.

In the dispersion liquid preparation step, the amount of titanium alkoxide added may be adjusted to control the primary particle size of the porous particles. The larger the amount of titanium alkoxide added, the smaller the primary particle size of the porous particles. The mass ratio of the titanium alkoxide to the alcohol is preferably 0.04 or more and 0.65 or less, more preferably 0.1 or more and 0.5 or less.

Examples of the titanium alkoxide used for the dispersion liquid preparation step include tetraalkoxytitanium such as tetramethoxytitanium, tetraethoxytitanium, tetrapropoxytitanium, and tetrabutoxytitanium; and alkoxytitanium chelates in which alkoxy groups are partially used for chelating, such as di-i-propoxy-bis(ethylacetato)titanium, and di-i-propoxy-bis(acetylacetonato)titanium. These may be used alone or in combination of two or more thereof.

The titanium oxide aerogel particles may contain a small amount of a non-titanium metal element such as silicon or aluminum. In this case, examples of usable compounds include tetraalkoxysilane such as tetramethoxysilane, tetraethoxysilane, tetrapropoxysilane, and tetrabutoxysilane; alkyltrialkoxysilane such as methyltrimethoxysilane, methyltriethoxysilane, and ethyltriethoxysilane; alkyldialkoxysilane such as dimethyldimethoxysilane, and dimethyldiethoxysilane; and aluminum alkoxide such as aluminum isopropoxide. The titanium oxide aerogel particles may be produced so as to contain the silicon element with an element ratio Si/Ti of silicon to titanium in a range of 0 to 0.05.

Examples of the alcohol used in the dispersion liquid preparation step include methanol, ethanol, propanol, and butanol. These may be used alone or in combination of two or more thereof.

Examples of the acid of the acid aqueous solution used in the dispersion liquid preparation step include oxalic acid, acetic acid, hydrochloric acid, and nitric acid. The acid concentration of the acid aqueous solution is preferably 0.001 mass % or more and 1 mass % or less, more preferably 0.005 mass % or more and 0.01 mass % or less.

The amount of the acid aqueous solution dropped relative to 100 parts by mass of titanium alkoxide in the dispersion liquid preparation step may be 0.001 parts by mass or more and 0.1 parts by mass or less.

The porous particle dispersion liquid obtained by the dispersion liquid preparation step may have a solid content concentration of 1 mass % or more and 30 mass % or less.

(2) Solvent Removal Step

The solvent removal step is a step of bringing supercritical carbon dioxide into contact with a dispersion liquid containing porous particles and a solvent, to remove the solvent. This solvent removal treatment using supercritical carbon dioxide is less likely to cause collapse or clogging of pores of porous particles, compared with heating solvent removal treatment. When the solvent removal step is such a step using supercritical carbon dioxide to remove the solvent, titanium oxide aerogel particles having a BET specific surface area of 120 $m^2/g$ or more can be provided.

Specifically, the solvent removal step is performed by the following procedures, for example.

Into a sealed reaction vessel, the porous particle dispersion liquid is placed, and subsequently liquid carbon dioxide is introduced. The sealed reaction vessel is then heated and simultaneously internally pressurized using a high-pressure pump, to turn carbon dioxide within the sealed reaction vessel to a supercritical state. Subsequently, liquid carbon dioxide is caused to flow into the sealed reaction vessel, and supercritical carbon dioxide is caused to flow out from the sealed reaction vessel, to thereby pass supercritical carbon dioxide through the porous particle dispersion liquid within the sealed reaction vessel. While supercritical carbon dioxide passes through the porous particle dispersion liquid, the solvent dissolves in supercritical carbon dioxide, and is removed together with the supercritical carbon dioxide flowing out from the sealed reaction vessel.

The temperature and pressure within the sealed reaction vessel are selected so as to turn carbon dioxide to a supercritical state. Since carbon dioxide has a critical point at 31.1° C. and at 7.38 MPa, the temperature is set to 50° C. or more and 200° C. or less and the pressure is set to 10 MPa or more and 30 MPa or less, for example.

Untreated Silica-Titania Composite Aerogel Particles

The untreated silica-titania composite aerogel particles are particles containing, as the main component (the highest content component among all components of the particles), a silica-titania composite that is a silicon-titanium composite oxide.

In the untreated silica-titania composite aerogel particles, the element ratio Si/Ti of silicon to titanium is preferably, from the viewpoint of providing photocatalytic action in the visible-light region, more than 0 and 6 or less, more preferably 0.05 or more and 4 or less, still more preferably 0.1 or more and 3 or less.

The element ratio of silicon atoms to titanium atoms (Si/Ti) is determined by performing XPS qualitative analysis (wide scanning analysis) to create elemental profiles of the silica-titania composite. Specifically, this is performed in the following manner.

An XPS instrument is used under conditions described below: the silica-titania composite is etched from the surface in the depth direction, and simultaneously subjected to qualitative analysis (wide scanning analysis), to identify and quantify titanium atoms, silicon atoms, and carbon atoms. On the basis of the obtained data, elemental profiles for titanium atoms, silicon atoms, and carbon atoms are individually drawn with the ordinate axis indicating peak intensity and the abscissa axis indicating etching time. The profile curves are divided at the inflection points into plural regions. Of the regions, regions (regions A described later) are identified in which the peak intensity of titanium atoms and the peak intensity of silicon atoms are substantially constant. In these regions, the element ratio Si/Ti is determined.

XPS instrument: Versa Probe II, manufactured by ULVAC-PHI, Inc.

X-ray source: monochromatic AlKα radiation

Acceleration voltage: 15 kV

X-ray beam diameter: 100 μm

Etching gun: argon ion beam

Etching voltage: 4 kV

In the untreated silica-titania composite aerogel particles, the total content of the silica component and the titania component relative to the total mass of the composite is preferably 80 mass % or more, more preferably 90 mass % or more, still more preferably 95 mass % or more.

The untreated silica-titania composite aerogel particles may be particles including base particles having an element ratio Si/Ti of silicon to titanium in a range of more than 0 and 6 or less, and titania layers (layers composed of titania) on the surfaces of the base particles. In other words, the untreated silica-titania composite aerogel particles may be particles having a titania layer as the surface layer. These particles may be used because a stronger photocatalytic action is provided.

The silica-titania composite aerogel particles preferably have a BET specific surface area of, from the viewpoint of providing a strong photocatalytic action, 200 $m^2/g$ or more and 1200 $m^2/g$ or less, more preferably 300 $m^2/g$ or more and 1100 $m^2/g$ or less, still more preferably 400 $m^2/g$ or more and 1000 $m^2/g$ or less. The BET specific surface area of the silica-titania composite aerogel particles is determined by a gas adsorption method using nitrogen gas.

The method for producing the untreated silica-titania composite aerogel particles may be a sol-gel process using alkoxysilane and titanium alkoxide as the raw materials.

The untreated silica-titania composite aerogel particles may be composed of the hydrolysis-condensation product from alkoxysilane and titanium alkoxide. However, the composite may contain some unreacted hydrocarbon groups such as alkoxy groups of alkoxysilane or titanium alkoxide.

Hereinafter, the method for producing the untreated silica-titania composite aerogel particles will be described.

The method for producing the untreated silica-titania composite aerogel particles may include at least the following steps (1') and (2'):

(1') a step of forming porous particles containing a silica-titania composite by a sol-gel process, to prepare a dispersion liquid containing the porous particles and a solvent (dispersion liquid preparation step); and (2') a step of using supercritical carbon dioxide to remove the solvent from the dispersion liquid (solvent removal step).

(1') Dispersion Liquid Preparation Step

The dispersion liquid preparation step is, for example, a step of causing reactions (hydrolysis and condensation) of alkoxysilane and titanium alkoxide as raw materials to form a silica-titania composite, to obtain a dispersion liquid in which porous particles containing the silica-titania composite are dispersed in a solvent. The porous particles may be aggregate particles in which primary particles containing the silica-titania composite form a porous aggregate.

Specifically, the dispersion liquid preparation step is, for example, the following step.

To alcohol, alkoxysilane and titanium alkoxide are added; to this under stirring, an acid aqueous solution is dropped to cause a reaction of alkoxysilane and titanium alkoxide to form a silica-titania composite. This provides a dispersion liquid (porous particle dispersion liquid) in which porous particles containing the silica-titania composite are dispersed in the alcohol.

In the dispersion liquid preparation step, the mixing ratio of alkoxysilane and titanium alkoxide may be adjusted to control the element ratio Si/Ti of silicon to titanium in the untreated silica-titania composite aerogel particles.

In the dispersion liquid preparation step, the total amount of alkoxysilane and titanium alkoxide relative to the amount of alcohol may be adjusted to control the particle size of the primary particles constituting the untreated silica-titania aerogel particles and the particle size of the untreated silica-titania aerogel particles. The larger the above-described total amount relative to the amount of alcohol, the smaller the particle size of the primary particles constituting the untreated silica-titania composite aerogel particles, the larger the particle size of the untreated silica-titania composite aerogel particles. The total amount of alkoxysilane and titanium alkoxide relative to 100 parts by mass of alcohol is preferably 4 parts by mass or more and 250 parts by mass or less, more preferably 10 parts by mass or more and 50 parts by mass or less.

Examples of the alkoxysilane used in the dispersion liquid preparation step include tetraalkoxysilane such as tetramethoxysilane, tetraethoxysilane, tetrapropoxysilane, and tetrabutoxysilane; alkyltrialkoxysilane such as methyltrimethoxysilane, methyltriethoxysilane, and ethyltriethoxysilane; and alkyldialkoxysilane such as dimethyldimethoxysilane and dimethyldiethoxysilane. These may be used alone or in combination of two or more thereof.

Examples of the titanium alkoxide used for the dispersion liquid preparation step include tetraalkoxytitanium such as tetramethoxytitanium, tetraethoxytitanium, tetrapropoxytitanium, and tetrabutoxytitanium; and alkoxytitanium chelates in which alkoxy groups are partially used for chelating, such as di-i-propoxy-bis(ethylacetoacetato)titanium, and di-i-propoxy-bis(acetylacetonato)titanium. These may be used alone or in combination of two or more thereof.

In the dispersion liquid preparation step, examples of the alcohol include methanol, ethanol, propanol, and butanol. These may be used alone or in combination of two or more thereof.

In the dispersion liquid preparation step, examples of the acid of the acid aqueous solution include oxalic acid, acetic acid, hydrochloric acid, and nitric acid. The acid aqueous solution preferably has an acid concentration of 0.001 mass % or more and 1 mass % or less, more preferably 0.005 mass % or more and 0.01 mass % or less.

In the dispersion liquid preparation step, the amount of acid aqueous solution dropped relative to 100 parts by mass of the total amount of alkoxysilane and titanium alkoxide may be 0.001 parts by mass or more and 0.1 parts by mass or less.

The porous particle dispersion liquid obtained by the dispersion liquid preparation step may have a solid content concentration of 1 mass % or more and 30 mass % or less.

(2') Solvent Removal Step

The solvent removal step is a step of bringing supercritical carbon dioxide into contact with a dispersion liquid containing porous particles and a solvent, to remove the solvent. This solvent removal treatment using supercritical carbon dioxide is less likely to cause collapse or clogging of pores of porous particles (in particular, aggregate particles that are a porous aggregate of primary particles), compared with heating solvent removal treatment. When the solvent removal step is such a step using supercritical carbon dioxide to remove the solvent, untreated silica-titania composite aerogel particles having a BET specific surface area of 200 $m^2/g$ or more can be provided.

Specifically, the solvent removal step is performed by the following procedures, for example.

Into a sealed reaction vessel, the porous particle dispersion liquid is placed, and subsequently liquid carbon dioxide is introduced. The sealed reaction vessel is then heated and simultaneously internally pressurized using a high-pressure pump, to turn carbon dioxide within the sealed reaction vessel to a supercritical state. Subsequently, liquid carbon dioxide is caused to flow into the sealed reaction vessel, and supercritical carbon dioxide is caused to flow out from the sealed reaction vessel, to thereby pass supercritical carbon dioxide through the porous particle dispersion liquid within the sealed reaction vessel. While supercritical carbon dioxide passes through the porous particle dispersion liquid, the solvent dissolves in supercritical carbon dioxide, and is removed together with the supercritical carbon dioxide flowing out from the sealed reaction vessel.

The temperature and pressure within the sealed reaction vessel are selected so as to turn carbon dioxide to a supercritical state. Since carbon dioxide has a critical point at 31.1° C. and at 7.38 MPa, the temperature is set to 50° C. or more and 200° C. or less and the pressure is set to 10 MPa or more and 30 MPa or less, for example.

When untreated silica-titania composite aerogel particles are produced as particles having a titania layer as the surface layer, the (1') dispersion liquid preparation step may be performed by the following procedures (i) and (ii).

(i) To alcohol, alkoxysilane and titanium alkoxide are added; to this under stirring, an acid aqueous solution is dropped to cause a reaction of the alkoxysilane and the titanium alkoxide to form a silica-titania composite. This provides a dispersion liquid (first dispersion liquid) in which base particles containing the silica-titania composite are dispersed in the alcohol.

(ii) To the first dispersion liquid under stirring, a mixture in which titanium alkoxide is mixed with alcohol is dropped to cause a reaction of the base particles and the titanium alkoxide to form porous particles in which intermediate layers are formed on the surfaces of the base particles. This provides a dispersion liquid (second dispersion liquid) in which the porous particles are dispersed in the alcohol.

Organometallic Compound

The organometallic compound is a metallic compound having a metal atom and a hydrocarbon group.

The organometallic compound may be, from the viewpoint of providing higher adsorbability for microorganisms and providing higher visible-light response, a metallic compound composed of only atom species of a metal atom, a carbon atom, a hydrogen atom, and an oxygen atom.

The organometallic compound may be, from the viewpoint of providing higher visible-light response, bonded to the surface of a particle via an oxygen atom O directly bonded to a metal atom M of the organometallic compound, in other words, bonded to the surface of a particle in the form of covalently bonded M-O—Ti (M-O—Ti or M-O—Si when the titanium-based compound particles are silica-titania composite aerogel particles).

The organometallic compound may be, from the viewpoint of providing higher adsorbability for microorganisms and providing higher visible-light response, an organometallic compound having a metal atom M and a hydrocarbon group directly bonded to the metal atom M. The organometallic compound may be bonded to the surface of a particle via an oxygen atom O directly bonded to the metal atom M of the organometallic compound. In other words, the particle may have, on its surface, from the viewpoint of providing higher adsorbability for microorganisms and providing higher visible-light response, a covalently bonded sequence of a hydrocarbon group, a metal atom M, an oxygen atom O, and a titanium atom Ti (hydrocarbon group-M-O—Ti (hydrocarbon group-M-O—Ti or hydrocarbon group-M-O—Si when the titanium-based compound particles are silica-titania composite aerogel particles)).

When the organometallic compound includes plural hydrocarbon groups, at least one hydrocarbon group may be directly bonded to the metal atom of the organometallic compound.

The chemical bond state between the atoms of the organometallic compound is determined by the high-resolution analysis (narrow scanning analysis) of XPS (X-ray Photoelectron Spectroscopy).

The metal atom M of the organometallic compound is preferably a silicon atom, an aluminum atom, or a titanium atom, more preferably a silicon atom or an aluminum atom, particularly preferably a silicon atom.

The hydrocarbon group of the organometallic compound may be a saturated or unsaturated aliphatic hydrocarbon group having 1 or more and 40 or less carbon atoms (preferably 1 or more and 20 or less carbon atoms, more preferably 1 or more and 18 or less carbon atoms, still more preferably 4 or more and 12 or less carbon atoms, yet more preferably 4 or more and 10 or less carbon atoms), or an aromatic hydrocarbon group having 6 or more and 27 or less carbon atoms (preferably 6 or more and 20 or less carbon atoms, more preferably 6 or more and 18 or less carbon atoms, still more preferably 6 or more and 12 or less carbon atoms, particularly preferably 6 or more and 10 or less carbon atoms).

The hydrocarbon group of the organometallic compound is preferably, from the viewpoint of providing a strong photocatalytic action and improved dispersibility, an aliphatic hydrocarbon group, more preferably a saturated aliphatic hydrocarbon group, particularly preferably an alkyl group. The aliphatic hydrocarbon group may be linear, branched, or cyclic, but is preferably linear or branched from the viewpoint of dispersibility. The number of carbon atoms of the aliphatic hydrocarbon group is preferably 1 or more and 20 or less, more preferably 1 or more and 18 or less, still more preferably 4 or more and 12 or less, particularly preferably 4 or more and 10 or less.

The organometallic compound is particularly preferably a silane compound having a hydrocarbon group. Examples of the silane compound having a hydrocarbon group include chlorosilane compounds and alkoxysilane compounds.

The silane compound having a hydrocarbon group is preferably, from the viewpoint of providing a strong photocatalytic action and improved dispersibility, a compound represented by Formula (1) of $R^1_n SiR^2_m$.

In Formula (1) of $R^1_n SiR^2_m$, $R^1$ represents a saturated or unsaturated aliphatic hydrocarbon group having 1 or more and 20 or less carbon atoms or an aromatic hydrocarbon group having 6 or more and 20 or less carbon atoms; $R^2$ represents a halogen atom or an alkoxy group; n represents an integer of 1 or more and 3 or less; m represents an integer of 1 or more and 3 or less, provided that n+m=4. When n is an integer of 2 or 3, plural $R^1$'s may be the same group or different groups. When m is an integer of 2 or 3, plural $R^2$'s may be the same group or different groups.

The aliphatic hydrocarbon group represented by $R^1$ may be linear, branched, or cyclic, but is preferably linear or branched from the viewpoint of dispersibility. The aliphatic hydrocarbon group preferably has, from the viewpoint of providing a strong photocatalytic action and improved dispersibility, 1 or more and 20 or less carbon atoms, more preferably 1 or more and 18 or less carbon atoms, still more preferably 4 or more and 12 or less carbon atoms, still more preferably 4 or more and 10 or less carbon atoms. The aliphatic hydrocarbon group may be saturated or unsaturated, but is preferably, from the viewpoint of providing a strong photocatalytic action and improved dispersibility, a saturated aliphatic hydrocarbon group, more preferably an alkyl group.

Examples of the saturated aliphatic hydrocarbon group include linear alkyl groups (such as a methyl group, an ethyl group, a propyl group, a butyl group, a pentyl group, a hexyl group, a heptyl group, an octyl group, a nonyl group, a decyl group, a dodecyl group, a hexadecyl group, and an icosyl group), branched alkyl groups (such as an isopropyl group, an isobutyl group, an isopentyl group, a neopentyl group, a 2-ethylhexyl group, a tertiary butyl group, a tertiary pentyl group, and an isopentadecyl group), and cyclic alkyl groups (such as a cyclopropyl group, a cyclopentyl group, a cyclohexyl group, a cycloheptyl group, a cyclooctyl group, a tricyclodecyl group, a norbornyl group, and an adamantyl group).

Examples of the unsaturated aliphatic hydrocarbon group include alkenyl groups (such as a vinyl group (ethenyl group), a 1-propenyl group, a 2-propenyl group, a 2-butenyl group, a 1-butenyl group, a 1-hexenyl group, a 2-dodecenyl group, and a pentenyl group), and alkynyl groups (such as an ethynyl group, a 1-propynyl group, a 2-propynyl group, a 1-butynyl group, a 3-hexynyl group, and a 2-dodecynyl group).

Such aliphatic hydrocarbon groups also encompass substituted aliphatic hydrocarbon groups. Examples of the substituent for the aliphatic hydrocarbon groups include halogen atoms, an epoxy group, a glycidyl group, a glycidoxy group, a mercapto group, a methacryloyl group, and an acryloyl group.

The aromatic hydrocarbon group represented by $R^1$ preferably has 6 or more and 20 or less carbon atoms, more preferably 6 or more and 18 or less carbon atoms, still more preferably 6 or more and 12 or less carbon atoms, particularly preferably 6 or more and 10 or less carbon atoms.

Examples of the aromatic hydrocarbon group include a phenylene group, a biphenylene group, a terphenylene group, a naphthalene group, and an anthracene group.

Such aromatic hydrocarbon groups also encompass substituted aromatic hydrocarbon groups. Examples of the substituent for the aromatic hydrocarbon groups include halogen atoms, an epoxy group, a glycidyl group, a glycidoxy group, a mercapto group, a methacryloyl group, and an acryloyl group.

Examples of the halogen atom represented by $R^2$ include a fluorine atom, a chlorine atom, a bromine atom, and an iodine atom. Preferred halogen atoms are a chlorine atom, a bromine atom, and an iodine atom.

The alkoxy group represented by $R^2$ may be an alkoxy group having 1 or more and 10 or less carbon atoms (preferably 1 or more and 8 or less carbon atoms, more preferably 3 or more and 8 or less carbon atoms). Examples of the alkoxy group include a methoxy group, an ethoxy group, an isopropoxy group, a t-butoxy group, an n-butoxy group, an n-hexyloxy group, a 2-ethylhexyloxy group, and a 3,5,5-trimethylhexyloxy group. Such alkoxy groups also encompass substituted alkoxy groups. Examples of the substituent for the alkoxy groups include halogen atoms, a hydroxy group, an amino group, alkoxy groups, an amide group, and a carbonyl group.

The compound represented by Formula (1) of $R^1{}_n SiR^2{}_m$ is preferably, from the viewpoint of providing a strong photocatalytic action and improved dispersibility, a compound where $R^1$ represents a saturated aliphatic hydrocarbon group. In particular, the compound represented by Formula (1) of $R^1{}_n SiR^2{}_m$ is preferably a compound where $R^1$ represents a saturated aliphatic hydrocarbon group having 1 or more and 20 or less carbon atoms, $R^2$ represents a halogen atom or an alkoxy group, n represents an integer of 1 or more and 3 or less, and m represents an integer of 1 or more and 3 or less, provided that n+m=4.

Examples of the compound represented by Formula (1) of $R^1{}_n SiR^2{}_m$ include silane compounds such as vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, phenyltrichlorosilane (in these compounds, n=1, m=3);

dimethyldimethoxysilane, dimethyldiethoxysilane, methylvinyldimethoxysilane, methylvinyldiethoxysilane, diphenyldimethoxysilane, diphenyldiethoxysilane, dimethyldichlorosilane, dichlorodiphenylsilane (in these compounds, n=2, m=2);

trimethylmethoxysilane, trimethylethoxysilane, trimethylchlorosilane, decyldimethylchlorosilane, triphenylchlorosilane (in these compounds, n=3, m=1); and 3-glycidoxypropyltrimethoxysilane, γ-methacryloxypropyltrimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl)aminopropylmethyldimethoxysilane, and γ-glycidyloxypropylmethyldimethoxysilane (in these compounds, $R^1$ is a substituted aliphatic hydrocarbon group or a substituted aromatic hydrocarbon group). Such silane compounds may be used alone or in combination of two or more thereof.

The hydrocarbon group of the silane compound represented by Formula (1) is preferably, from the viewpoint of providing a strong photocatalytic action and improved dispersibility, an aliphatic hydrocarbon group, more preferably a saturated aliphatic hydrocarbon group, particularly preferably an alkyl group. The hydrocarbon group of the silane compound is preferably, from the viewpoint of providing a strong photocatalytic action and improved dispersibility, a saturated aliphatic hydrocarbon group having 1 or more and 20 or less carbon atoms, more preferably a saturated aliphatic hydrocarbon group having 1 or more and 18 or less carbon atoms, still more preferably a saturated aliphatic hydrocarbon group having 4 or more and 12 or less carbon atoms, particularly preferably a saturated aliphatic hydrocarbon group having 4 or more and 10 or less carbon atoms.

Examples of the organometallic compound having a metal atom that is aluminum include alkyl aluminate such as triethoxyaluminum, tri-i-propoxyaluminum, and tri-sec-butoxyaluminum; aluminum chelates such as di-i-propoxy-mono-sec-butoxyaluminum, and di-i-propoxyaluminum ethylacetoacetate; and aluminate-based coupling agents such as acetoalkoxyaluminum diisopropylate.

Examples of the organometallic compound having a metal atom that is titanium include titanate-based coupling agents such as isopropyltriisostearoyl titanate, tetraoctyl bis(ditridecylphosphite) titanate, and bis(dioctylpyrophosphate)oxyacetate titanate; and titanium chelates such as di-i-propoxy bis(ethylacetoacetato)titanium, di-i-propoxy bis(acetylacetonato)titanium, di-i-propoxy bis(triethanolaminato)titanium, di-i-propoxytitanium diacetate, and di-i-propoxytitanium dipropionate.

Such organometallic compounds may be used alone or in combination of two or more thereof.

Method for Producing Photocatalyst Particles

The method for producing photocatalyst particles is not particularly limited. The photocatalyst particles are obtained by, for example, subjecting untreated particles to surface treatment using an organometallic compound.

Hereinafter, an example of the method for producing photocatalyst particles will be described.

The method for producing photocatalyst particles may include, for example, (a) a step of subjecting untreated particles to surface treatment using an organometallic compound, and (b) a step of, during or after the step of subjecting the untreated particles to surface treatment, subjecting the particles to heat treatment.

(a) Surface Treatment Step

The method of subjecting untreated particles to surface treatment using an organometallic compound is not particularly limited; examples of the method include a method of bringing an organometallic compound into direct contact with untreated particles; and a method of bringing a treatment liquid containing an organometallic compound dissolved in a solvent, into contact with untreated particles. Specific examples include a method of adding the organometallic compound itself or the treatment liquid to a dispersion liquid, under stirring, containing untreated particles dispersed in a solvent; and a method of adding (dropping or spraying, for example) the organometallic compound or the treatment liquid to untreated particles being fluidized by, for example, stirring using a Henschel mixer or the like. As a result of such methods, reactive groups (such as hydrolyzable groups such as halogeno groups or alkoxy groups) in the organometallic compound react with hydroxy groups present in the surfaces of the untreated particles, so that the untreated particles are surface-treated.

The surface treatment step may be performed in the air or a nitrogen atmosphere. However, when untreated particles that are titanium oxide aerogel particles or silica-titania composite aerogel particles are subjected to surface treatment, the surface treatment step is preferably performed in supercritical carbon dioxide. In this case, the organometallic compound reaches deep inside the pores of the porous particles, to achieve surface treatment of even portions deep in the pores of the porous particles. For this reason, the surface treatment is preferably performed in supercritical carbon dioxide.

The surface treatment step in supercritical carbon dioxide is performed, for example: an organometallic compound and porous bodies under stirring are mixed in supercritical carbon dioxide to react. Alternatively, the surface treatment step is performed, for example: an organometallic compound and a solvent are mixed to prepare a treatment liquid; porous bodies and the treatment liquid under stirring are mixed in supercritical carbon dioxide. In order to increase the specific surface area while the porous structures of the porous bodies are maintained, the organometallic compound may be added to supercritical carbon dioxide still after completion of the solvent removal step, to cause the organometallic compound to react with the surfaces of the porous bodies in supercritical carbon dioxide.

Examples of the solvent in which the organometallic compound is dissolved include organic solvents (such as hydrocarbon solvents, ester-based solvents, ether-based solvents, halogen-based solvents, and alcohol-based solvents), water, and solvent mixtures of the foregoing. Examples of the hydrocarbon solvents include toluene, benzene, xylene, hexane, octane, hexadecane, and cyclohexane. Examples of the ester-based solvents include methyl acetate, ethyl acetate, isopropyl acetate, and amyl acetate. Examples of the ether-based solvents include dibutyl ether and dibenzyl ether. Examples of the halogen-based solvents include 1,1-dichloro-1-fluoroethane, 1,1-dichloro-2,2,2-trifluoroethane, 1,1-dichloro-2,2,3,3,3-pentafluoropropane, chloroform, dichloroethane, and carbon tetrachloride. Examples of the alcohol-based solvents include methanol, ethanol, and i-propyl alcohol. Examples of the water include tap water, distilled water, and pure water. Other examples of the solvent include dimethylformamide, dimethylacetamide, dimethyl sulfoxide, acetic acid, and sulfuric acid.

In the treatment liquid containing the organometallic compound dissolved in a solvent, the concentration of the organometallic compound is preferably 0.05 mol/L or more and 500 mol/L or less, more preferably 0.5 mol/L or more and 10 mol/L or less.

The surface treatment of particles using the organometallic compound may be performed under the following conditions, from the viewpoint of providing a strong photocatalytic action and improved dispersibility. The untreated particles may be surface-treated with the organometallic compound in an amount of, relative to the untreated particles, 10 mass % or more and 100 mass % or less (preferably 20 mass % or more and 75 mass % or less, more preferably 25 mass % or more and 50 mass % or less). When the amount of organometallic compound is set to 10 mass % or more, a strong photocatalytic action tends to be provided also in the visible-light region, and high dispersibility tends to be provided. When the amount of organometallic compound is set to 100 mass % or less, the amount of organometallic-compound-derived metal present on the surfaces of the particles is prevented from becoming excessively large, to thereby suppress degradation of photocatalytic action due to excess metal.

The temperature of the surface treatment using the organometallic compound for untreated particles is preferably 15° C. or more and 150° C. or less, more preferably 20° C. or more and 100° C. or less. The time for the surface treatment is preferably 10 minutes or more and 120 minutes or less, more preferably 30 minutes or more and 90 minutes or less.

However, when the surface treatment is performed in supercritical carbon dioxide, the temperature and pressure of the surface treatment step are set so as to bring carbon dioxide to a supercritical state. For example, the surface treatment step is performed in an atmosphere at a temperature of 50° C. or more and 200° C. or less and at a pressure of 10 MPa or more and 30 MPa or less. The reaction time is preferably 10 minutes or more and 24 hours or less, more preferably 20 minutes or more and 120 minutes or less, still more preferably 30 minutes or more and 90 minutes or less.

After the surface treatment using the organometallic compound is performed for untreated particles, drying treatment may be performed. The method of the drying treatment is not particularly limited, and is selected from, for example, publicly known drying methods such as vacuum drying and spray drying. The drying temperature may be 20° C. or more and 150° C. or less.

However, when the surface treatment is performed in supercritical carbon dioxide, preferably performed is a step of using supercritical carbon dioxide to remove the solvent from the dispersion liquid containing porous particles, more preferably performed is a step of, subsequent to completion of the surface treatment step, still passing supercritical carbon dioxide in supercritical carbon dioxide to remove the solvent.

(b) Heat Treatment Step

Heat treatment is performed during the step of subjecting untreated particles to surface treatment, or after the step of subjecting untreated particles to surface treatment.

Heat treatment may be separately performed during surface treatment using the organometallic compound for untreated particles, or during drying treatment after the surface treatment, or after the drying treatment. From the viewpoint of sufficiently causing the reaction of the organometallic compound and the particles before heat treatment, heat treatment is preferably separately performed during drying treatment after the surface treatment, or after the drying treatment; more preferably, from the viewpoint of appropriately performing the drying treatment, heat treatment is separately performed after the drying treatment.

The heat treatment is preferably performed at a temperature of, from the viewpoint of providing a strong photocatalytic action and improved dispersibility, 180° C. or more and 500° C. or less, more preferably 200° C. or more and 450°

C. or less, still more preferably 250° C. or more and 400° C. or less. The heat treatment is preferably performed for a time of, from the viewpoint of providing a strong photocatalytic action and improved dispersibility, 10 minutes or more and 300 minutes or less, more preferably 30 minutes or more and 120 minutes or less. When the heat treatment is performed during the step of subjecting untreated particles to surface treatment, the organometallic compound may be sufficiently caused to react at the above-described surface treatment temperature before heat treatment is performed at the above-described heat treatment temperature. When the heat treatment is performed during the drying treatment performed after the surface treatment, the drying treatment is performed at the heat treatment temperature.

The heat treatment performed at a temperature of 180° C. or more and 500° C. or less efficiently provides particles that provide a strong photocatalytic action also in the visible-light region. Inferentially, such heat treatment at 180° C. or more and 500° C. or less causes appropriate oxidation of metallic-compound-derived hydrocarbon groups present on the surfaces of the particles, to turn some of C—C bonds or C=C bonds into C—O bonds or C=O bonds.

The heat treatment is preferably performed in an atmosphere having an oxygen concentration (vol %) of 1% or more and 21% or less. The heat treatment in such an oxygen atmosphere enables appropriate and efficient oxidation of metallic-compound-derived hydrocarbon groups present on the surfaces of the particles. The oxygen concentration (vol %) is more preferably 3% or more and 21% or less, still more preferably 5% or more and 21% or less.

The method of performing the heat treatment is not particularly limited, and is, for example, selected from publicly known heating processes such as heating using an electric furnace, a baking furnace (a roller hearth kiln, or a shuttle kiln, for example), or a thermal radiation furnace, for example; and heating using a laser beam, infrared radiation, UV, or microwaves, for example.

The above-described steps provide appropriate photocatalyst particles.

Characteristics of Photocatalyst Particles

The photocatalyst particles exhibit absorption at a wavelength of 500 nm in a visible absorption spectrum.

The photocatalyst particles, from the viewpoint of providing a strong photocatalytic action also in the visible-light region, preferably exhibit, in a visible absorption spectrum, absorption at wavelengths of 450 nm and 500 nm, more preferably exhibit absorption at wavelengths of 450 nm, 500 nm, and 550 nm, still more preferably exhibit absorption at wavelengths of 450 nm, 500 nm, 550 nm, and 600 nm, yet more preferably exhibit absorption at wavelengths of 450 nm, 500 nm, 550 nm, 600 nm, and 700 nm.

The photocatalyst particles, from the viewpoint of providing a strong photocatalytic action also in the visible-light region, preferably exhibit absorption, in a visible absorption spectrum, over the whole wavelength region of 450 nm or more and 500 nm or less, more preferably over the whole wavelength region of 400 nm or more and 550 nm or less, still more preferably over the whole wavelength region of 400 nm or more and 600 nm or less, particularly preferably over the whole wavelength region of 400 nm or more and 700 nm or less.

The photocatalyst particles, from the viewpoint of providing a strong photocatalytic action also in the visible-light region, may exhibit the following absorbances at wavelengths in a visible absorption spectrum that are calculated relative to the absorbance (defined as 1) at a wavelength of 350 nm in an ultraviolet-visible absorption spectrum:

the absorbance at a wavelength of 450 nm is 0.02 or more, preferably 0.1 or more, more preferably 0.2 or more, still more preferably 0.3 or more;

the absorbance at a wavelength of 500 nm is 0.02 or more, preferably 0.1 or more, more preferably 0.2 or more, still more preferably 0.3 or more;

the absorbance at a wavelength of 550 nm is 0.02 or more, preferably 0.1 or more, more preferably 0.15 or more, still more preferably 0.2 or more;

the absorbance at a wavelength of 600 nm is 0.02 or more, preferably 0.05 or more, more preferably 0.1 or more; and the absorbance at a wavelength of 700 nm is 0.02 or more, preferably 0.05 or more, more preferably 0.08 or more.

The photocatalyst particles preferably have, from the viewpoint of providing a strong photocatalytic action also in the visible-light region, in a visible absorption spectrum, an absorbance ratio (550 nm/450 nm) of the absorbance at a wavelength of 550 nm to the absorbance at a wavelength of 450 nm of 0.1 or more, more preferably 0.2 or more, still more preferably 0.3 or more, yet more preferably 0.4 or more.

The photocatalyst particles that are titanium-based compound particles tend to absorb ultraviolet radiation. The photocatalyst particles that exhibit visible-light response as a result of surface modification of titanium-based compound particles exhibit relatively strong absorption for blue light, which, among visible light, has wavelengths close to ultraviolet radiation; in this case, when the photocatalyst particles have an absorbance ratio 550 nm/450 nm of 0.1 or more, the titanium-based compound particles are sufficiently surface-modified as visible-light-region response photocatalyst particles.

The photocatalyst particles that exhibit visible-light response as a result of surface modification of titanium-based compound particles tend to have an absorbance ratio 550 nm/450 nm of less than 1, or 0.8 or less.

The ultraviolet-visible absorption spectrum of photocatalyst particles is obtained in the following manner. The particles to be measured are dispersed in tetrahydrofuran, subsequently applied onto a glass substrate, and dried in the air at 24° C. A spectrophotometer (for example, U-4100, manufactured by Hitachi High-Technologies Corporation; scan speed: 600 nm, slit width: 2 nm, sampling: in 1 nm steps) is used for diffuse reflectance measurement to measure a diffuse reflectance spectrum in a wavelength region of 200 nm to 900 nm. The diffuse reflectance spectrum is subjected to Kubelka-Munk transformation to thereby theoretically determine absorbances at wavelengths.

The measured values are affected by the glass substrate depending on, for example, the film thickness of the coating particles and have errors; thus, the measured values are corrected. Specifically, the absorbance at 900 nm is subtracted from the absorbances at wavelengths to obtain absorbances at the wavelengths.

The photocatalyst particles have an absorption peak, in an infrared absorption spectrum, in a wave number range of 2700 cm$^{-1}$ or more and 3000 cm$^{-1}$ or less.

Specifically, for example, the photocatalyst particles preferably have at least one absorption peak, in an infrared absorption spectrum, in a wave number range of 2700 cm$^{-1}$ or more and 3000 cm$^{-1}$ or less. The phrase "have an absorption peak" means "exhibit absorption having an absorption intensity (absorbance) of 0.022 (a transmittance of 5%) or more".

The infrared absorption spectrum of the photocatalyst particles is measured in the following manner. From the photocatalyst particles to be measured, a measurement sample is prepared by the KBr disk method. The measurement sample is measured with an infrared spectrophotometer (FT-IR-410, manufactured by JASCO Corporation) under conditions of 300 accumulations and 4 cm$^{-1}$ resolution, in a wave number range of 500 cm$^{-1}$ or more and 4000 cm$^{-1}$ or less, to obtain an infrared absorption spectrum.

The photocatalyst particles preferably have an average primary particle size of 1 nm or more and 200 nm or less, more preferably 5 nm or more and 150 nm or less, still more preferably 10 nm or more and 100 nm or less. When the photocatalyst particles have an average primary particle size of 1 nm or more, the particles are less likely to aggregate and tend to provide a stronger photocatalytic action. When the photocatalyst particles have an average primary particle size of 200 nm or less, the photocatalyst particles have a higher specific surface area for the amount, and tend to provide a stronger photocatalytic action. Thus, when the photocatalyst particles are prepared so as to have an average primary particle size satisfying such a range, the photocatalyst particles tend to provide a strong photocatalytic action in the visible-light region.

The average primary particle size of the photocatalyst particles is measured by the following method.

The photocatalyst particles are observed with a scanning electron microscope (manufactured by Hitachi, Ltd., S-4100) and images are captured. The captured images are imported into an image analyzer (LUZEX III, manufactured by NIRECO CORPORATION); the images are analyzed to determine the areas of the particles, and, from the areas, equivalent circular diameters (nm) are determined. The equivalent circular diameters of 100 primary particles are averaged to determine the average particle size of the primary particles.

When the photocatalyst particles are silica-titania composite aerogel particles, the photocatalyst particles may be particles provided by subjecting untreated silica-titania composite aerogel particles having surface layers that are titania layers to surface treatment using an organometallic compound.

Specifically, these particles have a base particle (for example, a base particle having an element ratio Si/Ti of silicon to titanium of more than 0 and 6 or less), a titania layer (hereafter, also referred to as the "intermediate layer") present on the surface of the base particle, and a layer in which a metallic compound having a metal atom and a hydrocarbon group is bonded, via an oxygen atom, to the surface of the titania layer (that is, a layer containing a metallic compound having a metal atom and a hydrocarbon group; hereafter, also referred to as the "surface layer").

Whether the silica-titania composite aerogel particles have the above-described layers is determined by the following method. Incidentally, whether particles other than silica-titania composite aerogel particles have the surface layer is also determined by the following method.

A qualitative analysis (wide scanning analysis) of XPS is performed while silica-titania composite aerogel particles are etched from the surfaces in the depth direction using rare gas ions, to identify and quantify at least titanium, silicon, and carbon. On the basis of the obtained data, elemental profiles for at least titanium, silicon, and carbon are drawn, with the ordinate axis indicating peak intensity, the abscissa axis indicating etching time. The profile curves are divided at inflection points into plural regions, to determine a region reflecting the element composition of the base particles, a region reflecting the element composition of the intermediate layer, and a region reflecting the element composition of the surface layer. When the elemental profiles include the region reflecting the element composition of the intermediate layer, the silica-titania composite aerogel particles are judged to have the intermediate layer. When the elemental profiles have the region reflecting the element composition of the surface layer, the silica-titania composite aerogel particles are judged to have the surface layer.

Hereinafter, this method will be described with reference to FIG. 7 as an example.

Figure 7:
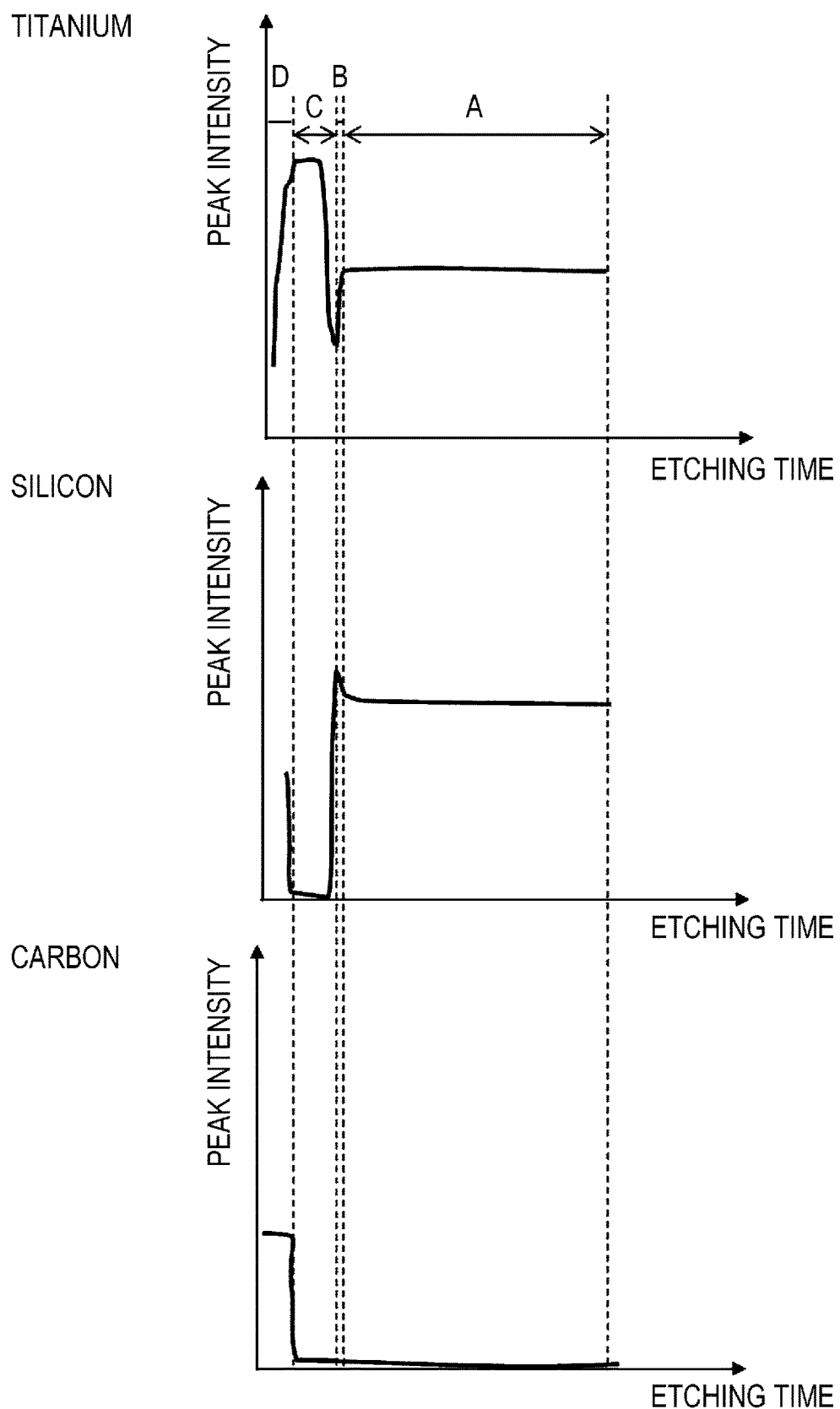
FIG. 7 is an example of elemental profiles of silica-titania composite particles that are, in descending order, the elemental profile of titanium, the elemental profile of silicon, and the elemental profile of carbon.

FIG. 7 illustrates an example of elemental profiles of silica-titania composite aerogel particles that are, in descending order, the elemental profile of titanium, the elemental profile of silicon, and the elemental profile of carbon.

The elemental profiles in FIG. 7 are divided at inflection points of the profile curves into region A, region B, region C, and region D.

Region A: a region present in the final stage of etching, where the peak intensity of titanium and the peak intensity of silicon remain substantially constant.

Region B: a region present immediately before the region A, where, toward the particle surface, the peak intensity of titanium decreases and the peak intensity of silicon increases.

Region C: a region present immediately before the region B, where the peak intensity of titanium remains substantially constant, and silicon is substantially not detected.

Region D: a region present in the initial stage of etching, where the peak intensity of carbon remains substantially constant, and the metal elements are also detected.

The region A and the region B are regions reflecting the element composition of the base particles. During production of the base particles, silica and titania form covalent bonds in a ratio in accordance with the mixing ratio of alkoxysilane and titanium alkoxide that are materials of the silica-titania composite, to form base particles. In the surfaces of the base particles, silica tends to appear, compared with titania. As a result, the elemental profiles have the region A, which appears in the final stage of etching, where the peak intensity of titanium and the peak intensity of silicon remain substantially constant; and the region B, which appears immediately before the region A, where, toward the particle surface, the peak intensity of titanium decreases and the peak intensity of silicon increases.

The region C is a region reflecting the element composition of the intermediate layer. When, immediately before the region B, there is the region C, that is, a region where the peak intensity of titanium remains substantially constant and silicon is substantially not detected, the silica-titania composite aerogel particles are judged to have the intermediate layer that is a "titania layer".

The region C is a region reflecting the element composition of the first layer; however, the region does not necessarily completely correspond to the intermediate layer. A portion of the region C close to the region B may also reflect the element composition of the base particles.

The region D is a region reflecting the element composition of the surface layer. When, in the initial stage of etching, there is the region D, that is, a region where the peak intensity of carbon remains substantially constant, and the metal elements are also detected, the silica-titania composite aerogel particles are judged to have a surface layer that is "a layer containing a metallic compound having a metal atom and a hydrocarbon group".

The metal atoms forming the metallic compound in the surface layer may be silicon, aluminum, and titanium. For this reason, aluminum may be optionally identified and quantified by XPS, and the elemental profile of aluminum is also drawn.

The region D is a region reflecting the element composition of the surface layer; however, the region does not necessarily completely correspond to the second layer. A portion of the region D close to the region C may also reflects the element composition of the first layer.

From the elemental profiles in FIG. 7, the particles are judged to be silica-titania composite aerogel particles having the base particle, the intermediate layer, and the surface layer where the metal atoms forming the metallic compound in the surface layer are silicon.

Characteristics Etc. Of Water Purification Member

The water purification member preferably has a photocatalyst particle loading of, from the viewpoint of efficient sterilization and purification of an aqueous medium (for example, efficient sterilization and purification of a nutrient solution), 1 mass % or more and 60 mass % or less, more preferably 5 mass % or more and 50 mass % or less, still more preferably 10 mass % or more and 40 mass % or less.

The photocatalyst particle loading is determined by measuring the mass of the porous body before and after loading, and using the following equation.

Photocatalyst loading (mass %) relative to porous body=[(Mass of post-loading porous body−Mass of pre-loading porous body)/Mass of post-loading porous body]×100

When the porous body is formed of, for example, a fibrous material, a resin porous body, or paper, a thermogravimetric analyzer (model: Q50, manufactured by TA Instruments) is used to measure the ignition loss of the water purification member, and the following equation is used to determine the photocatalyst loading on the porous body.

Photocatalyst loading (mass %) on porous body= [(Mass of water purification member upon heating at 400° C.)/(Mass of water purification member upon heating at 120° C.)]×100

The water purification member preferably has a visible-light transmittance of, from the viewpoint of efficient sterilization and purification of an aqueous medium (for example, efficient sterilization and purification of a nutrient solution), 1% or more and 50% or less, more preferably 2% or more and 40% or less, still more preferably 3% or more and 20% or less.

When the water purification member has a visible-light transmittance satisfying such a range, visible light tends to reach the loaded photocatalyst particles, to facilitate efficient sterilization and purification of an aqueous medium (for example, efficient sterilization and purification of a nutrient solution).

The visible-light transmittance of the water purification member is measured in the following manner.

The total luminous transmittance (%) is measured in accordance with JIS K7361-1:1997, using a haze meter (NDH-2000, manufactured by NIPPON DENSHOKU INDUSTRIES CO., LTD.).

The visible-light transmittance of the water purification member is measured while photocatalyst particles are loaded on the porous body.

The water purification member preferably has a liquid absorption of, from the viewpoint of efficient sterilization and purification of an aqueous medium (for example, efficient sterilization and purification of a nutrient solution), 10 mass % or more and 500 mass % or less, more preferably 30 mass % or more and 300 mass % or less, still more preferably 50 mass % or more and 200 mass % or less.

When the water purification member has a liquid absorption satisfying such a range, the target microorganisms in the aqueous medium (such as a nutrient solution) being purified have a high probability of coming into contact with the loaded photocatalyst particles, which facilitates efficient sterilization and purification of the aqueous medium (for example, efficient sterilization and purification of a nutrient solution).

The liquid absorption of the water purification member is measured in the following manner.

A sample (about 1 g, which is defined as $m_1$) of the water purification member is weighed, and is placed on a stainless steel sieve having a sieve opening of 1 mm (inner diameter of 75 mm×height of 20 mm).

Subsequently, the sieve containing the sample is immersed for 30 minutes in a glass dish (inner diameter of 146 mm×height of 28 mm) containing 300 mL of pure water (when the water purification member is not immersed because, for example, it floats over water, it is immersed by being fixed with, for example, a tool such as a net).

Subsequently, the mass of the sample after the immersion is measured (as $m_2$).

The following equation is used to calculate the liquid absorption.

Liquid absorption(mass %)=$(m_2-m_1)/m_1 \times 100$ $m_1$=mass (g) of sample before immersion
$m_2$=mass (g) of sample after immersion These procedures are performed three times, and the calculated values are averaged to determine the liquid absorption.

The water purification member preferably has a BET specific surface area of, from the viewpoint of efficient sterilization and purification of an aqueous medium (for example, efficient sterilization and purification of a nutrient solution), 1 m$^2$/g or more and 300 m$^2$/g or less, more preferably 10 m$^2$/g or more and 200 m$^2$/g or less, still more preferably 20 m$^2$/g or more and 150 m$^2$/g or less.

When the water purification member has a BET specific surface area satisfying such a range, the target microorganisms in the aqueous medium (such as a nutrient solution) being purified have a high probability of coming into contact with the loaded photocatalyst particles, which facilitates efficient sterilization and purification of the aqueous medium (for example, efficient sterilization and purification of a nutrient solution).

The BET specific surface area of the water purification member is measured while photocatalyst particles are loaded on the porous body. The BET specific surface area is measured by a gas adsorption method using nitrogen gas.

A ratio (photocatalyst particle loading/volume of nutrient solution or aqueous medium) of the photocatalyst particle loading (kg) in the water purification member to the volume (L) of the nutrient solution held in the container of the hydroponic system (or the aqueous medium held in the container of the water purification apparatus) is preferably, from the viewpoint of efficient sterilization and purification of the aqueous medium (for example, efficient sterilization and purification of the nutrient solution), $0.1 \times 10^{-3}$ kg/L or more and $20 \times 10^{-3}$ kg/L or less, more preferably $0.2 \times 10^{-3}$ kg/L or more and $10 \times 10^{-3}$ kg/L or less, still more preferably $0.3 \times 10^{-3}$ kg/L or more and $5 \times 10^{-3}$ kg/L or less.

A ratio (total surface area of water purification member/volume of nutrient solution or aqueous medium) of the total surface area (m$^2$) of the water purification member (=BET specific surface area of water purification member×mass of water purification member) to the volume (L) of the nutrient solution held in the container of the hydroponic system (or the aqueous medium held in the container of the water purification apparatus) is preferably, from the viewpoint of efficient sterilization and purification of the aqueous medium (for example, efficient sterilization and purification of the nutrient solution), 15 m$^2$/L or more and 3000 m$^2$/L or less, more preferably 30 m$^2$/L or more and 1500 m$^2$/L or less, still more preferably 60 m$^2$/L or more and 800 m$^2$/L or less.

Method for Producing Water Purification Member

The method for producing the water purification member according to the exemplary embodiment is not particularly limited, but may be, for example, the following method:

1) a method in which a dispersion liquid of photocatalyst particles is applied to a porous body, and subsequently dried, to load the photocatalyst particles onto the porous body.

In this method, the photocatalyst particles composed of the specific titanium-based compound particles have a large specific surface area and exhibit a strong adhesion, hence adhere directly to the surface of the porous body and become fixed. The process of applying the dispersion liquid may be selected from well-known coating processes such as immersion coating and spray coating. Examples of the dispersion medium of the dispersion liquid include volatile dispersion media such as water and various alcohols. Alternatively, methods of using a binder resin to load photocatalyst particles onto a porous body may be employed:

2) a method in which a solution containing fibers and photocatalyst particles is subjected to a wet lay process to obtain a fibrous porous body and to load the photocatalyst particles onto the surfaces of the fibers;

3) a method in which photocatalyst particles are caused to adhere to (for example, electrostatically adhere to) the surfaces of fibers of a fibrous porous body (for example, a fibrous porous body composed of core-sheath composite fibers), and subsequently heated, wherein the heating melts the surfaces of the fibers, and the photocatalyst particles are fused and fixed to the surfaces of the fibers, and thus loaded;

4) a method in which heated photocatalyst particles are caused to adhere to (for example, electrostatically adhere to) a fibrous porous body (for example, a fibrous porous body composed of core-sheath composite fibers) wherein the heated photocatalyst particles melt the surfaces of the fibers, and the photocatalyst particles are fused and fixed to the surfaces of the fibers, and thus loaded; and 5) a method in which fibers containing photocatalyst particles are used to produce a porous body, wherein, for example, an electrospinning process is used to produce, from a solution containing fibers and photocatalyst particles, fibers containing the photocatalyst particles, and a porous body (for example, nonwoven fabric) is produced.

EXAMPLES

Hereinafter, exemplary embodiments of the present disclosure will be described in detail with reference to Examples. However, exemplary embodiments of the present disclosure are not limited to these Examples at all. In the following description, terms "part" are all based on mass unless otherwise specified.

Preparation of Photocatalyst Particles

Metatitanic Acid Particles MTA1

To a titanyl sulfate solution having a TiO$_2$ concentration of 260 g/L and a Ti$^{3+}$ concentration of 6.0 g/L in terms of TiO$_2$, separately prepared anatase seeds are added in an amount of 10 mass % (in terms of TiO$_2$) relative to TiO$_2$ in the titanyl sulfate solution. Subsequently, this solution is heated at the boiling point or higher, to hydrolyze titanyl sulfate (TiOSO$_4$), to generate particulate metatitanic acid. Subsequently, the metatitanic acid particles are filtered and washed, subsequently turned into slurry, and subjected to neutralization washing at pH 7. This provides metatitanic acid slurry having an average primary particle size of 30 nm.

Subsequently, to the metatitanic acid slurry having an average primary particle size of 30 nm under stirring, a 5 N sodium hydroxide aqueous solution is added to adjust the pH to 8.5; the slurry is held for 2 hours under stirring, subsequently neutralized with 6 N hydrochloric acid to pH 5.8, and filtered and washed with water. After the washing, water is added to provide slurry again; the slurry under stirring is mixed with 6 N hydrochloric acid to have a pH of 1.3, and held for 3 hours under stirring. From the slurry, 100 parts by mass of metatitanic acid is separated; while the metatitanic acid is held at 60° C. under heating and stirring, it is mixed with 40 parts by mass of hexyltrimethoxysilane, stirred for 30 minutes, subsequently mixed with a 7 N sodium hydroxide aqueous solution to pH 7, and filtered and washed with water. The resultant residue is subjected to spray drying with a flash dryer set at an exit temperature of 150° C., to obtain a dry powder. The obtained dry powder is subjected to heat treatment at 280° C. for 90 minutes in an electric furnace set to have an oxygen concentration (vol %) of 12%, to obtain metatitanic acid particles MTA1. The BET specific surface area of the metatitanic acid particles MTA1 is measured and found to be 220 m$^2$/g.

Metatitanic Acid Particles MTA2

Metatitanic acid particles MTA2 having an average primary particle size of 60 nm and a BET specific surface area of 150 m$^2$/g are obtained as with the metatitanic acid particles MTA1 except that the amount of anatase seeds added is changed to 7 mass %.

Metatitanic Acid Particles MTA3

Metatitanic acid particles MTA3 having an average primary particle size of 120 nm and a BET specific surface area of 60 m$^2$/g are obtained as with the metatitanic acid particles MTA1 except that the amount of anatase seeds added is changed to 5 mass %.

Titanium Oxide Particles TO1

To a dispersion liquid in which commercially available anatase titanium oxide particles ("ST-01 (manufactured by ISHIHARA SANGYO KAISHA, LTD.)", average primary particle size: 8 nm) are dispersed in methanol, 40 mass % of hexyltrimethoxysilane relative to the untreated titanium oxide particles is dropped; the reaction is caused at 40° C. for 1 hour, and subsequently spray drying is performed at an exit temperature of 120° C. to obtain a dry powder. The obtained dry powder is subjected to heat treatment at 290° C. for 1 hour in an electric furnace set at an oxygen concentration (vol %) of 18%, to obtain titanium oxide particles TO1. The BET specific surface area of the titanium oxide particles TO1 is measured and found to be 180 m$^2$/g.

Titanium Oxide Particles TO2

To a dispersion liquid in which commercially available anatase titanium oxide particles ("ST-21 (manufactured by ISHIHARA SANGYO KAISHA, LTD.)", average primary particle size: 20 nm) are dispersed in methanol, 40 mass % of octyltrimethoxysilane relative to the untreated titanium oxide particles is dropped; the reaction is caused at 40° C. for 1 hour, and subsequently spray drying is performed at an exit temperature of 120° C. to obtain a dry powder. The obtained dry powder is subjected to heat treatment at 270° C. for 1 hour in an electric furnace set at an oxygen concentration (vol %) of 20%, to obtain titanium oxide particles TO2. The BET specific surface area of the titanium oxide particles TO2 is measured and found to be 120 m²/g.

Titanium Oxide Particles TO3

To a dispersion liquid in which anatase titanium oxide particles prepared by a sol-gel process and having an average primary particle size of 160 nm are dispersed in methanol, 30 mass % of hexyltrimethoxysilane relative to the untreated titanium oxide particles is dropped; the reaction is caused at 40° C. for 1 hour, and subsequently spray drying is performed at an exit temperature of 120° C. to obtain a dry powder. The obtained dry powder is subjected to heat treatment at 300° C. for 1 hour in an electric furnace set at an oxygen concentration (vol %) of 18%, to obtain titanium oxide particles TO3. The BET specific surface area of the titanium oxide particles TO3 is measured and found to be 15 m²/g.

Titanium Oxide Aerogel Particles TOAG1

Methanol (115.4 parts) and 14.3 parts of tetrabutoxytitanium are charged into a reaction vessel and mixed. To the mixture under stirring at 100 rpm using a magnetic stirrer, 7.5 parts of a 0.009 mass % oxalic acid aqueous solution is dropped over 30 seconds. The mixture still under stirring is held for 30 minutes, to obtain 137.3 parts of a dispersion liquid (1) (solid content: 3.4 parts, liquid phase content: 133.9 parts).

Subsequently, 137.3 parts of the dispersion liquid (1) is placed into a pressure tank; while the dispersion liquid (1) is stirred at 85 rpm, $CO_2$ is injected using a high-pressure pump; and the pressure tank is heated and pressurized to 150° C. and 20 MPa to bring $CO_2$ to a supercritical state. While the dispersion liquid (1) is still stirred, supercritical $CO_2$ is caused to flow in and flow out, to remove 133 parts of the liquid phase over 60 minutes.

Subsequently, to the solid phase provided by the removal of the liquid phase, an entrainer pump is used to add a mixture of 3.4 parts of isobutyltrimethoxysilane and 3.4 parts of methanol over 5 minutes; while the resultant mixture is stirred at 85 rpm, still at 150° C. and 20 MPa, it is held for 30 minutes. To the mixture still under stirring, supercritical $CO_2$ is caused to flow in and flow out, to remove 6.5 parts of the liquid phase over 30 minutes. The pressure is reduced to the atmospheric pressure over 30 minutes, to obtain 4.6 parts of a powder.

Subsequently, 4.0 parts of the powder is weighed into a SUS container, subjected to heat treatment at 315° C. for 60 minutes in an electric furnace set at an oxygen concentration (vol %) of 20%, and left to cool to 30° C. The obtained powder is sifted through a vibratory sieve having a sieve opening of 45 μm to remove coarse particles, to obtain titanium oxide aerogel particles TOAG1 having an average primary particle size of 80 nm and a BET specific surface area of 350 m²/g.

Silica-Titania Composite Aerogel Particles STAG1

Methanol (115.4 parts) and 7.2 parts of tetramethoxysilane are charged into a reaction vessel and mixed. Furthermore, 7.2 parts of tetrabutoxytitanium is added, and the mixture is mixed. To the mixture being stirred at 100 rpm with a magnetic stirrer, 7.5 parts of a 0.009 mass % oxalic acid aqueous solution is dropped over 30 seconds. The mixture still under stirring is held for 30 minutes, to obtain 137.2 parts of a first dispersion liquid (I-1) (solid content: 4.5 parts, liquid phase content: 132.7 parts).

Subsequently, 137.2 parts of the first dispersion liquid (I-1) is placed into a pressure tank; while the first dispersion liquid (I-1) is stirred at 85 rpm, $CO_2$ is injected using a high-pressure pump; and the pressure tank is heated and pressurized to 150° C. and 20 MPa to bring $CO_2$ to a supercritical state. While the first dispersion liquid (I-1) is still stirred, supercritical $CO_2$ is caused to flow in and flow out, to remove 132.0 parts of the liquid phase over 60 minutes.

Subsequently, to the solid phase provided by the removal of the liquid phase, an entrainer pump is used to drop a mixture of 4.5 parts of isobutyltrimethoxysilane and 4.5 parts of methanol over 5 minutes; while the resultant mixture is stirred at 85 rpm, still at 150° C. and at 20 MPa, it is held for 30 minutes. While the mixture is still stirred, supercritical $CO_2$ is caused to flow in and flow out, to remove 8.2 parts of the liquid phase over 30 minutes. The pressure is reduced to the atmospheric pressure over 30 minutes, to collect 6.0 parts of a powder.

Subsequently, 4.0 parts of the powder is weighed into a SUS container, and placed on a hot plate. The powder is heated to 380° C., held for 60 minutes, and subsequently left to cool to 30° C. The obtained powder is sifted through a vibratory sieve having a sieve opening of 45 μm to remove coarse particles, to obtain silica-titania composite aerogel particles STAG1 having an average primary particle size of 30 nm and a BET specific surface area of 680 m²/g.

The silica-titania composite aerogel particles STAG1 have a base particle having an element ratio Si/Ti of silicon to titanium of 3.1, and a surface layer being present on the surface of the base particle and containing isobutyltrimethoxysilane.

Silica-Titania Composite Aerogel Particles STAG2

Methanol (115.4 parts) and 7.2 parts of tetramethoxysilane are charged into a reaction vessel, and mixed. Furthermore, 7.2 parts of tetrabutoxytitanium is added, and the mixture is mixed. To the mixture being stirred at 100 rpm with a magnetic stirrer, 7.5 parts of a 0.009 mass % oxalic acid aqueous solution is dropped over 30 seconds. The mixture still under stirring is held for 30 minutes, to obtain 137.2 parts of a first dispersion liquid (I-1) (solid content: 4.5 parts, liquid phase content: 132.7 parts).

Subsequently, 137.2 parts of the first dispersion liquid (I-1) is charged into a reaction vessel; to the first dispersion liquid (I-1) being stirred at 100 rpm with a magnetic stirrer, a mixture of 1.5 parts of tetrabutoxytitanium and 4.5 parts of butanol is dropped over 10 minutes. The mixture still under stirring is held for 30 minutes, to obtain 143.2 parts of a second dispersion liquid (II-1) (solid content: 5.0 parts, liquid phase content: 138.2 parts).

Subsequently, 143.2 parts of the second dispersion liquid (II-1) is charged into a pressure tank; while the second dispersion liquid (II-1) is stirred at 85 rpm, a high-pressure pump is used to inject $CO_2$; the pressure tank is heated and pressurized to 150° C. and 20 MPa to bring $CO_2$ to a supercritical state. While the second dispersion liquid (II-1) is still stirred, supercritical $CO_2$ is caused to flow in and flow out, to remove 138 parts of the liquid phase over 60 minutes.

Subsequently, to the solid phase provided by the removal of the liquid phase, an entrainer pump is used to add a mixture of 4.5 parts of isobutyltrimethoxysilane and 4.5 parts of methanol over 5 minutes; while the resultant mixture is stirred at 85 rpm, still at 150° C. and at 20 MPa, it is held for 30 minutes. While the mixture is still stirred, supercritical $CO_2$ is caused to flow in and flow out, to remove 7.0 parts of the liquid phase over 30 minutes. The pressure is reduced to the atmospheric pressure over 30 minutes, to collect 7.2 parts of a powder.

Subsequently, 4.0 parts of the powder is weighed into a SUS container, and placed on a hot plate. The powder is heated to 450° C., held for 60 minutes, and subsequently left to cool to 30° C. The obtained powder is shifted through a vibratory sieve having a sieve opening of 45 μm to remove coarse particles, to obtain silica-titania composite aerogel particles STAG2 having an average primary particle size of 35 nm and a BET specific surface area of 480 m$^2$/g.

These silica-titania composite aerogel particles STAG2 have a base particle having an element ratio Si/Ti of silicon to titanium of 3.1, a titania layer (intermediate layer) present on the surface of the base particle, and a surface layer being present on the surface of the titania layer and containing isobutyltrimethoxysilane.

The photocatalyst particles produced above are measured for the following characteristics by the above-described methods. The results of the photocatalyst particles are summarized in Table 1.

Visible absorption spectrum characteristics (referred to as "Visi characteristics" in Table 1; relative to the absorbance at a wavelength of 350 nm being defined as 1, an absorbance at a wavelength of 450 nm, an absorbance at a wavelength of 500 nm, an absorbance at a wavelength of 550 nm, an absorbance at a wavelength of 600 nm, and an absorbance at a wavelength of 700 nm)

Infrared absorption spectrum characteristics (referred to as "IR characteristics" in Table 1; presence or absence of an absorption peak in a wave number range of 2700 cm$^{-1}$ or more and 3000 cm$^{-1}$ or less, and the wave number of the absorption peak)

Average primary particle size (referred to as "Particle size DC" in Table 1)

Example A1

The metatitanic acid particles MTA1 (100 parts) as photocatalyst particles are wetted with 50 parts of ethanol, subsequently 850 parts of ion-exchanged water is added and the resultant mixture is mixed; furthermore 3 parts of polyvinyl alcohol and 0.03 parts of ethylene glycol diglycidyl ether are added, and the resultant mixture is subjected to dispersion using an ultrasonic dispersion device. The resultant metatitanic acid particle slurry (50 parts) is subjected to suction filtration through 10 parts of No. 131 filter paper (manufactured by Advantec Group, 0600 mm) as a filter to thereby hold, in the filter paper, metatitanic acid particles in the metatitanic acid particle slurry. The filter paper is then dried at 120° C., and further washed with 100 parts of ion-exchanged water, to fix the metatitanic acid particles in the filter paper fibers.

This provides a water purification member having a thickness of 0.26 mm and composed of metatitanic-acid-particle-loaded paper (average fiber breadth: 20 μm, average fiber length: 1.5 mm, grammage=200 g/m$^2$, photocatalyst particle loading: 32 mass %, BET specific surface area: 70 m$^2$/g, hydrophilic).

Example A2

A water purification member having a thickness of 0.27 mm and composed of metatitanic-acid-particle-loaded paper (grammage=290 g/m$^2$, photocatalyst particle loading: 52 mass %, BET specific surface area: 115 m$^2$/g, hydrophilic) is prepared as in Example A1 except that the amount of metatitanic acid particle slurry in Example A1 is changed to 150 parts.

Example A3

A water purification member having a thickness of 0.12 mm and composed of metatitanic-acid-particle-loaded paper (average fiber breadth: 20 μm, average fiber length: 1.5 mm, grammage=105 g/m$^2$, photocatalyst particle loading: 8 mass %, BET specific surface area: 16 m$^2$/g, hydrophilic) is prepared as in Example A1 except that the paper in Example A1 is changed to 10 parts of 4A paper (manufactured by Advantec Group, 0600 mm), and the amount of metatitanic acid particle slurry in Example A1 is changed to 10 parts.

Example A4

A water purification member having a thickness of 0.26 mm and composed of metatitanic-acid-particle-loaded paper (grammage=200 g/m$^2$, photocatalyst particle loading: 30 mass %, BET specific surface area: 45 m$^2$/g, hydrophilic) is prepared as in Example A1 except that the photocatalyst particles in Example A1 are changed to the metatitanic acid particles MTA2.

Example A5

A water purification member having a thickness of 0.26 mm and composed of metatitanic-acid-particle-loaded paper (grammage=220 g/m$^2$, photocatalyst particle loading: 33 mass %, BET specific surface area: 18 m$^2$/g, hydrophilic) is prepared as in Example A1 except that the photocatalyst particles in Example A1 are changed to the metatitanic acid particles MTA3.

Example A6

A water purification member having a thickness of 0.26 mm and composed of titanium-oxide-particle-loaded paper (grammage=200 g/m$^2$, photocatalyst particle loading: 30 mass %, BET specific surface area: 55 m$^2$/g, hydrophilic) is prepared as in Example A1 except that the photocatalyst particles in Example A1 are changed to the titanium oxide particles TO1.

Example A7

A water purification member having a thickness of 0.26 mm and composed of titanium-oxide-particle-loaded paper (grammage=190 g/m$^2$, photocatalyst particle loading: 28 mass %, BET specific surface area: 32 m$^2$/g, hydrophilic) is prepared as in Example A1 except that the photocatalyst particles in Example A1 are changed to the titanium oxide particles TO2.

Example A8

A water purification member having a thickness of 0.26 mm and composed of titanium-oxide-particle-loaded paper (grammage=200 g/m$^2$, photocatalyst particle loading: 30 mass %, BET specific surface area: 5 m$^2$/g, hydrophilic) is prepared as in Example A1 except that the photocatalyst particles in Example A1 are changed to the titanium oxide particles TO3.

Example B1

The metatitanic acid particles MTA1 (30 parts) as photocatalyst particles are heated at 200° C., and subsequently sprayed onto 100 parts of core-sheath composite nonwoven fabric fibers (SOPHISTA, manufactured by KURARAY CO., LTD., average fiber breadth: 14 μm, fiber length: 51 mm, grammage: 90 g/m$^2$, thickness: 0.12 mm) having a core portion composed of polyethylene terephthalate (PET) and a sheath portion composed of an ethylene-vinyl alcohol copolymer (EVOH), to fix the photocatalyst particles on the EVOH surfaces of the fibers of the nonwoven fabric.

This provides a water purification member having a thickness of 0.12 mm and composed of metatitanic-acid-particle-loaded nonwoven fabric (average fiber breadth: 14 µm, average fiber length: 51 mm, grammage=100 g/m$^2$, photocatalyst particle loading: 10 mass %, hydrophilic).

Example B2

A water purification member having a thickness of 0.12 mm and composed of metatitanic-acid-particle-loaded nonwoven fabric (grammage=93 g/m$^2$, photocatalyst particle loading: 3 mass %, hydrophilic) is prepared as in Example B1 except that the amount of metatitanic acid particles MTA1 in Example B1 is changed to 10 parts.

Example B3

A water purification member having a thickness of 0.12 mm and composed of titanium-oxide-aerogel-particle-loaded nonwoven fabric (grammage=110 g/m$^2$, photocatalyst particle loading: 20 mass %, BET specific surface area: 68 m$^2$/g, hydrophilic) is prepared as in Example B1 except that the photocatalyst particles in Example B1 are changed to the titanium oxide aerogel particles TOAG1.

Example B4

A water purification member having a thickness of 0.12 mm and composed of silica-titania-composite-aerogel-particle-loaded nonwoven fabric (grammage=105 g/m$^2$, photocatalyst particle loading: 18 mass %, BET specific surface area: 120 m$^2$/g, hydrophilic) is prepared as in Example B1 except that the photocatalyst particles in Example B1 are changed to the silica-titania composite aerogel particles STAG1.

Example B5

A water purification member having a thickness of 0.12 mm and composed of silica-titania-composite-aerogel-particle-loaded nonwoven fabric (grammage=112 g/m$^2$, photocatalyst particle loading: 22 mass %, BET specific surface area: 105 m$^2$/g, hydrophilic) is prepared as in Example B1 except that the photocatalyst particles in Example B1 are changed to the silica-titania composite aerogel particles STAG2.

Example C1

To a solvent mixture of 100 parts of dichloromethane and 10 parts of N-methyl-2-pyrrolidone, 3 parts of the metatitanic acid particles MTA1 as photocatalyst particles are added and dispersed with an ultrasonic dispersion device; subsequently, 4 parts of cellulose triacetate is added and dispersed with an ultrasonic dispersion device. The resultant solution is treated with an electrospinner to form fibers, to thereby prepare metatitanic-acid-particle-loaded cellulose triacetate nonwoven fabric fibers.

This provides a water purification member having a thickness of 0.35 mm and composed of metatitanic-acid-particle-loaded nonwoven fabric (average fiber breadth: 10 µm, average fiber length: 38 mm, grammage=180 g/m$^2$, photocatalyst particle loading: 42 mass %, hydrophilic).

Example C2

A water purification member having a thickness of 0.28 mm and composed of metatitanic-acid-particle-loaded nonwoven fabric (grammage=220 g/m$^2$, photocatalyst particle loading: 58 mass %, hydrophilic) is prepared as in Example C1 except that the amount of metatitanic acid particles MTA1 in Example C1 is changed to 6 parts.

Example C3

A water purification member having a thickness of 0.40 mm and composed of metatitanic-acid-particle-loaded nonwoven fabric (grammage=280 g/m$^2$, photocatalyst particle loading: 18 mass %, hydrophilic) is prepared as in Example C1 except that the amount of metatitanic acid particles MTA1 in Example C1 is changed to 1 part.

Example C4

A water purification member having a thickness of 0.33 mm and composed of metatitanic-acid-particle-loaded nonwoven fabric (grammage=175 g/m$^2$, photocatalyst particle loading: 39 mass %, hydrophilic) is prepared as in Example C1 except that the photocatalyst particles in Example C1 are changed to the metatitanic acid particles MTA2.

Example D1

To 20 parts of the metatitanic acid particles MTA1 as photocatalyst particles, 200 parts of ethanol, 5 parts of tetraethoxysilane, and 0.5 parts of 0.1 N hydrochloric acid are added and dispersed with an ultrasonic dispersion device to prepare metatitanic acid particle slurry. This metatitanic acid slurry is subjected to suction filtration through 100 parts of a quartz glass porous body (manufactured by CoorsTek KK, average pore size: 10 µm, thickness: 1 mm) as a filter, and subsequently dried at 180° C., to fix the metatitanic acid particles on the glass porous body.

This provides a water purification member having a thickness of 1 mm and composed of a metatitanic-acid-particle-loaded porous body (average pore size: 10 µm, grammage=400 g/m$^2$, photocatalyst particle loading: 10 mass %, hydrophilic).

Comparative Example 1

A water purification member having a thickness of 0.25 mm and composed of titanium-oxide-particle-loaded paper (grammage=200 g/m$^2$, particle loading: 30 mass %, BET specific surface area: 45 m$^2$/g, hydrophilic) is prepared as in Example A1 except for use of commercially available titanium oxide particles (trade name: "ST-01 (manufactured by ISHIHARA SANGYO KAISHA, LTD.), average primary particle size: 8 nm, catalyst particles that do not provide photocatalytic action in response to visible light).

Comparative Example 2

Visible-light-response photocatalyst particles in which titanium oxide is loaded with copper (10 parts, trade name: LUMI-RESH, manufactured by Showa Denko Ceramics Co., Ltd., average primary particle size: 150 nm) and 30 parts of a silicone resin (KR400, manufactured by Shin-Etsu Chemical Co., Ltd.) are dissolved in 100 parts of ethanol, and dispersed with an ultrasonic dispersion device; the resultant dispersion is applied to a 0.23 m×0.3 m, 1 mm thick aluminum plate, and dried at 120° C., to prepare a water purification member composed of an aluminum plate (coating film thickness: 0.1 mm) coated with copper-loaded photocatalyst particles.

Evaluations

Evaluations of Characteristics

The obtained water purification members are measured for the following characteristics by the above-described methods.

Grammage (g/m$^2$) of water purification member

Photocatalyst particle loading (mass %) relative to water purification member

Visible-light transmittance (%) of water purification member

Liquid absorption (mass %) of water purification member

BET specific surface area (m$^2$/g) of water purification member

Evaluation of Water Purification

Figure 8:
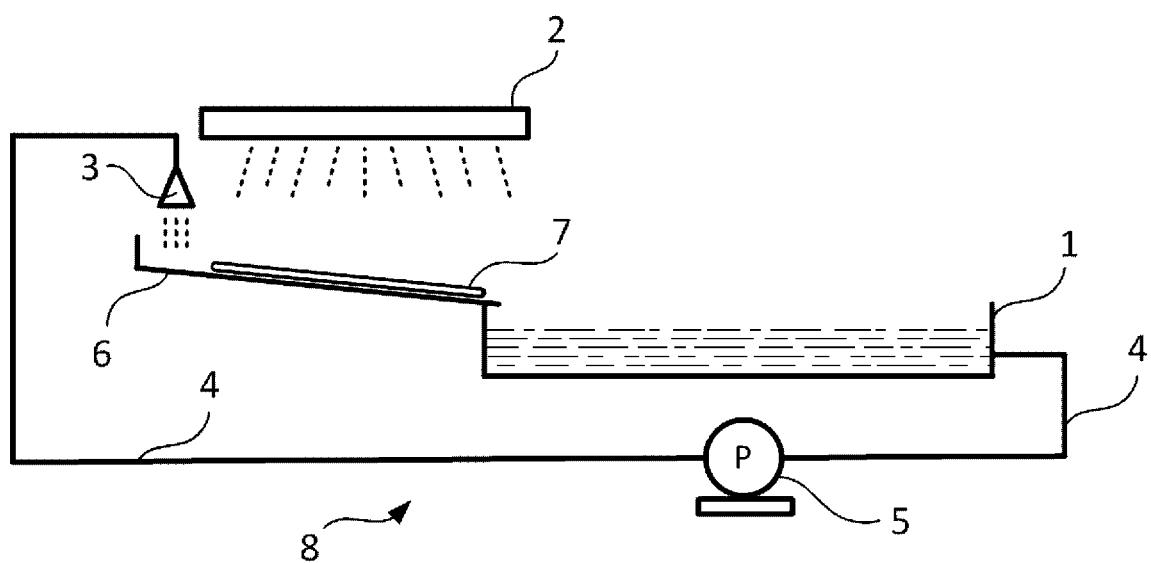
FIG. 8 is a schematic view of a water purification apparatus used in evaluations in EXAMPLES.

A water purification apparatus having the following configuration illustrated in FIG. 8 is prepared.

The water purification apparatus in FIG. 8 includes a storage tank 1 (an example of the container); a support 6, which is inclined relative to the horizontal direction and on which a water purification member 7 is disposed; an LED illuminator 2 (an example of the light radiation device), which radiates visible light to the water purification member 7 disposed on the support 6; and a circulation device 8, which circulates a nutrient solution stored in the storage tank 1.

The circulation device 8 includes a transfer pipe 4, which transfers the nutrient solution stored in the storage tank 1; a transfer pump 5 disposed at an intermediate position of the transfer pipe; and a drop nozzle 3, which drops the nutrient solution transferred from the transfer pipe 4 onto one end of the support 6.

In the water purification apparatus in FIG. 8, the water purification member 7 is disposed on the support 6; while the LED illuminator 2 radiates visible light to the water purification member 7, the nutrient solution is dropped onto one end of the support 6, to supply the nutrient solution via the water purification member 7 to the storage tank 1. The nutrient solution stored in the storage tank 1 is transferred by the transfer pump 5 via the transfer pipe 4; the nutrient solution is again dropped through the drop nozzle 3 to the one end of the support.

In this way, in the water purification apparatus in FIG. 8, the nutrient solution is circulated while being purified by the water purification member 7.

The evaluation apparatus having the configuration in FIG. 8 is used to evaluate the water purification performance. Specifically, this evaluation is performed in the following manner (reference signs are omitted).

1) The water purification member is provided so as to have a width of 0.23 m and a length of 0.3 m and is placed on the support.

2) The nutrient solution is prepared by dissolving 0.5 g of Otsuka House No. 5 powder in 10 L of water. The concentration of iron (nutrient) of the nutrient solution is adjusted to 2.85 ppm. The resultant nutrient solution in an amount is charged into the storage tank. A suspension of spores of *F. oxysporum* f. sp. *lycopersici* (100 ml, 6.2×10$^6$ cfu/ml) is added and mixed.

3) The power output of the transfer pump is adjusted such that the nutrient solution within the storage tank is supplied at a constant rate. The orientation of the drop nozzle is adjusted such that, from the drop nozzle, the nutrient solution uniformly flows through the whole water purification member on the support.

4) The illuminance of the LED illuminator Z-80PRO2-EIZO (manufactured by EIZO Corporation) is adjusted so as to be 20,000 lx at the surface of the water purification member. The transfer pump is operated to drop the nutrient solution onto the surface of the water purification member. Thus, the sterilization test for *F. oxysporum* f. sp. *lycopersici* in the nutrient solution is started.

5) Before the start of transfer of the nutrient solution and after the lapse of 24 hours from the start of transfer, 5 ml of the nutrient solution is sampled from the storage tank. In the nutrient solution samples, the viable cell count is determined to evaluate the water purification performance. In addition, the iron concentration of the nutrient solution is measured by ion chromatography to evaluate the nutrient insolubilization performance.

The evaluations are performed under the following conditions specifically described in Tables 2-1 to 3-2.

Number of water purification members stacked

Volume (L) of nutrient solution held in storage tank

Supply amount per unit time (L/min) of nutrient solution supplied to water purification member (described as "Nutrient solution, Supply amount" in Tables 2-2 and 3-2)

Flow rate (L/min/m$^3$) of nutrient solution flowing through water purification member, the flow rate being calculated from supply amount per unit time of nutrient solution supplied to water purification member and volume of water purification member (described as "Nutrient solution, Flow rate" in Tables 2-2 and 3-2)

Ratio (photocatalyst particle loading/nutrient solution volume) of photocatalyst particle loading SA (Kg) in water purification member to volume V (L) of nutrient solution held in storage tank (described as "SA/Vol" in Tables 2-2 and 3-2)

Ratio (total surface area of water purification member/nutrient solution volume) of total surface area S (m$^2$) of water purification member to volume V (L) of nutrient solution held in storage tank (described as "S/Vol" in Tables 2-2 and 3-2)

The volume of the nutrient solution held in the storage tank corresponds to the volume of the nutrient solution held in the container.

The supply amount per unit time of the nutrient solution supplied to the water purification member corresponds to the supply amount per unit time of the nutrient solution supplied to the container.

Evaluation of Water Purification Performance

The viable cell count of the nutrient solution is measured by the following dilution plate method.

From the nutrient solution sample, 0.1 ml of the solution is separated into a test tube, mixed with 9.9 ml of sterile water, and shaken to prepare a 10-fold diluted solution. Similarly, from this diluted solution, a 100-fold diluted solution is prepared; from this 100-fold diluted solution, a 1000-fold diluted solution is prepared. Subsequently, from the 1000-fold diluted solution, 1 ml of the solution is taken and placed into a sterile dish having a diameter of 9 cm; an agar medium cooled to a temperature just before solidification is poured into the dish, mixed with the solution, and subsequently left until solidification; subsequently, a 48-hour incubation is performed in an incubator at 35° C. In the resultant sample, the number of viable cells is counted, and the number is multiplied by 1000 to calculate the viable cell count.

The water purification performance is calculated using F=−LOG(F2/F1)×10 where F1 represents the viable cell count of the sample before start of transfer of the nutrient solution, and F2 represents the viable cell count of the sample after the lapse of 24 hours from the start of transfer, and evaluated using the following evaluation grades.
- A: $10 \leq F$
- B: $7 \leq F < 10$
- C: $3 \leq F < 7$
- D: $1 \leq F < 3$
- E: $F < 1$ Nutrient Deactivation Performance of Nutrient Solution The iron concentration of the nutrient solution is measured with an ion chromatograph.

The nutrient deactivation performance is calculated using $D = D2/D1$ where D1 represents the iron concentration of the sample before start of transfer of the nutrient solution, and D2 represents the iron concentration of the sample after the lapse of 24 hours from the start of transfer, and evaluated using the following evaluation grades.
- A: $0.9 \leq D$
- B: $0.8 \leq D < 0.9$
- C: $0.6 \leq D < 0.8$
- D: $0.4 \leq D < 0.6$
- E: $D < 0.4$

TABLE 1

| Photocatalyst particles | Particle size DC (nm) | BET specific surface area $m^2/g$ | Visi characteristics | | | | | IR characteristics |
|---|---|---|---|---|---|---|---|---|
| | | | Wavelength Absorbance at 450 nm | Wavelength Absorbance at 500 nm | Wavelength Absorbance at 550 nm | Wavelength Absorbance at 600 nm | Wavelength Absorbance at 700 nm | Wave number of absorption peak $(cm^{-1})$ |
| Metatitanic acid particles MTA1 | 30 | 220 | 0.42 | 0.33 | 0.24 | 0.12 | 0.08 | 2850/2920 |
| Metatitanic acid particles MTA2 | 60 | 150 | 0.44 | 0.26 | 0.22 | 0.09 | 0.05 | 2854/2924 |
| Metatitanic acid particles MTA3 | 120 | 60 | 0.36 | 0.22 | 0.18 | 0.06 | 0.02 | 2848/2918 |
| Titanium oxide particles TO1 | 8 | 180 | 0.46 | 0.32 | 0.26 | 0.14 | 0.08 | 2849/2917 |
| Titanium oxide particles TO2 | 20 | 120 | 0.38 | 0.24 | 0.19 | 0.11 | 0.04 | 2853/2917 |
| Titanium oxide particles TO3 | 160 | 15 | 0.32 | 0.19 | 0.14 | 0.08 | 0.02 | 2852/2919 |
| Titanium oxide aerogel particles TOAG1 | 80 | 350 | 0.37 | 0.3 | 0.2 | 0.11 | 0.06 | 2855/2920 |
| Silica-titania composite aerogel particles STAG1 | 30 | 680 | 0.38 | 0.21 | 0.15 | 0.06 | 0.02 | 2847/2921 |
| Silica-titania composite aerogel particles STAG2 | 35 | 480 | 0.4 | 0.24 | 0.17 | 0.1 | 0.05 | 2851/2923 |

TABLE 2-1

| | | | Water purification member | | | | | |
|---|---|---|---|---|---|---|---|---|
| | Photocatalyst particles | Grammage $g/m^2$ | Photocatalyst particle loading mass % | Thickness mm | Liquid absorption mass % | BET specific surface area $m^2/g$ | Number of water purification members stacked | Volume $\times 10^{-5}$ $m^3$ | Visible-light transmittance % |
| Example A1 | MTA1 | 200 | 32 | 0.26 | 200 | 70 | 1 | 1.79 | 6 |
| | | | | | | | 1 | 1.79 | 6 |
| | | | | | | | 1 | 1.79 | 6 |
| | | | | | | | 1 | 1.79 | 6 |
| | | | | | | | 2 | 3.59 | 2 |
| Example A2 | MTA1 | 290 | 52 | 0.27 | 160 | 115 | 1 | 1.86 | 4 |
| | | | | | | | 1 | 1.86 | 4 |
| | | | | | | | 2 | 3.73 | 1 |
| | | | | | | | 2 | 3.73 | 1 |
| | | | | | | | 2 | 3.73 | 1 |
| Example A3 | MTA1 | 105 | 8 | 0.12 | 280 | 16 | 1 | 0.83 | 35 |
| | | | | | | | 1 | 0.83 | 35 |
| | | | | | | | 2 | 1.66 | 16 |
| | | | | | | | 3 | 2.48 | 7 |
| Example A4 | MTA2 | 200 | 30 | 0.26 | 180 | 45 | 1 | 1.79 | 8 |
| Example A5 | MTA3 | 220 | 33 | 0.26 | 260 | 18 | 1 | 1.79 | 12 |
| | | | | | | | 2 | 3.59 | 4 |
| Example A6 | TO1 | 200 | 30 | 0.26 | 200 | 55 | 1 | 1.79 | 8 |

TABLE 2-1-continued

| | Water purification member | | | | | | | |
|---|---|---|---|---|---|---|---|---|
| | Photocatalyst particles | Grammage g/m² | Photocatalyst particle loading mass % | Thickness mm | Liquid absorption mass % | BET specific surface area m²/g | Number of water purification members stacked | Volume ×10⁻⁵ m³ | Visible-light transmittance % |
| Example A7 | TO2 | 190 | 28 | 0.26 | 230 | 32 | 1 | 1.79 | 9 |
| Example A8 | TO3 | 200 | 30 | 0.26 | 330 | 5 | 1 | 1.79 | 25 |

TABLE 2-2

| | Conditions of evaluation of water purification | | | | | Results of evaluation of water purification | |
|---|---|---|---|---|---|---|---|
| | Nutrient solution | | | | | | |
| | Volume L | Supply amount L/min | Flow rate L/min/m³ | SA/Vol ×10⁻³ kg/L | S/Vol m²/L | Water purification performance | Nutrient deactivation performance |
| Example A1 | 3 | 0.4 | 22400 | 1.47 | 320 | A | A |
| | 6 | 0.8 | 44900 | 0.74 | 161 | A | A |
| | 12 | 1.6 | 89300 | 0.37 | 81 | B | A |
| | 20 | 2.4 | 134600 | 0.22 | 48 | C | A |
| | 20 | 2.4 | 67300 | 0.44 | 97 | B | A |
| Example A2 | 3 | 0.4 | 21600 | 3.50 | 767 | A | A |
| | 2 | 0.2 | 10800 | 5.20 | 1150 | A | A |
| | 1.6 | 0.1 | 2700 | 13.00 | 2900 | A | B |
| | 20 | 4 | 108000 | 1.04 | 230 | B | A |
| | 1.6 | 0.03 | 850 | 13.00 | 2900 | A | B |
| Example A3 | 3 | 0.4 | 48600 | 0.19 | 39 | C | A |
| | 0.5 | 0.1 | 12200 | 1.16 | 232 | B | A |
| | 0.5 | 0.1 | 6080 | 2.32 | 464 | B | A |
| | 0.5 | 0.1 | 4050 | 3.48 | 696 | A | A |
| Example A4 | 3 | 0.4 | 22400 | 1.38 | 207 | A | A |
| Example A5 | 3 | 0.4 | 22400 | 1.67 | 91 | B | A |
| | 3 | 0.4 | 11200 | 3.34 | 182 | B | A |
| Example A6 | 2 | 0.4 | 22400 | 1.38 | 253 | A | A |
| Example A7 | 2 | 0.4 | 22400 | 1.22 | 140 | B | A |
| Example A8 | 2 | 0.4 | 22400 | 1.38 | 23 | C | A |

TABLE 3-1

| | Water purification member | | | | | | | | |
|---|---|---|---|---|---|---|---|---|---|
| | Photocatalyst particles | Grammage g/m² | Photocatalyst particle loading mass % | Thickness mm | Liquid absorption mass % | BET specific surface area m²/g | Number of water purification members stacked | Volume ×10⁻⁵ m³ | Visible-light transmittance % |
| Example B1 | MTA1 | 100 | 10 | 0.12 | 190 | 12 | 1 | 0.8 | 30 |
| | | | | | | | 1 | 0.8 | 30 |
| | | | | | | | 2 | 1.66 | 12 |
| Example B2 | MTA1 | 93 | 3 | 0.12 | 450 | 7 | 1 | 0.8 | 48 |
| | | | | | | | 1 | 0.8 | 48 |
| | | | | | | | 3 | 2.4 | 12 |
| Example B3 | TOAG1 | 110 | 20 | 0.12 | 110 | 68 | 1 | 0.8 | 20 |
| Example B4 | STAG1 | 105 | 18 | 0.12 | 80 | 120 | 1 | 0.8 | 16 |
| Example B5 | STAG2 | 112 | 22 | 0.12 | 95 | 105 | 1 | 0.8 | 18 |
| Example C1 | MTA1 | 180 | 42 | 0.35 | 45 | 92 | 1 | 2.42 | 4 |
| Example C2 | MTA1 | 220 | 58 | 0.28 | 28 | 128 | 1 | 1.93 | 2.5 |
| Example C3 | MTA1 | 280 | 18 | 0.4 | 150 | 38 | 1 | 2.76 | 12 |
| Example C4 | MTA2 | 175 | 39 | 0.33 | 75 | 58 | 1 | 2.28 | 6 |

TABLE 3-1-continued

| | Water purification member | | | | | | | | |
|---|---|---|---|---|---|---|---|---|---|
| | Photocatalyst particles | Grammage g/m² | Photocatalyst particle loading mass % | Thickness mm | Liquid absorption mass % | BET specific surface area m²/g | Number of water purification members stacked | Volume ×10⁻⁵ m³ | Visible-light transmittance % |
| Example D1 | MTA1 | 400 | 10 | 1 | 25 | 18 | 1 | 6.9 | 5 |
| Comparative Example 1 | ST-01 | 200 | 30 | 0.25 | 220 | 45 | 1 | 1.73 | 7 |
| Comparative Example 2 | Copper-loaded titanium oxide | | | | | | | | |

TABLE 3-2

| | Conditions of evaluation of water purification | | | | | Results of evaluation of water purification | |
|---|---|---|---|---|---|---|---|
| | Nutrient solution | | | | | | |
| | Volume L | Supply amount L/min | Flow rate L/min/m³ | SA/Vol ×10⁻³ kg/L | S/Vol m²/L | Water purification performance | Nutrient deactivation performance |
| Example B1 | 3 | 0.4 | 48600 | 0.23 | 28 | C | A |
| | 1 | 0.2 | 24300 | 0.69 | 83 | B | A |
| | 3 | 0.4 | 24300 | 0.46 | 55 | A | A |
| Example B2 | 3 | 0.4 | 48600 | 0.1 | 15 | C | A |
| | 1 | 0.2 | 24300 | 0.2 | 45 | C | A |
| | 3 | 0.4 | 16200 | 0.2 | 45 | B | A |
| Example B3 | 3 | 0.4 | 48600 | 0.51 | 172 | A | A |
| Example B4 | 3 | 0.4 | 48600 | 0.43 | 290 | B | A |
| Example B5 | 3 | 0.4 | 48600 | 0.56 | 270 | A | A |
| Example C1 | 3 | 0.4 | 16700 | 1.74 | 381 | A | A |
| Example C2 | 3 | 0.4 | 20800 | 2.93 | 648 | A | B |
| Example C3 | 3 | 0.4 | 14600 | 1.16 | 245 | B | A |
| Example C4 | 3 | 0.4 | 17700 | 1.57 | 233 | A | A |
| Example D1 | 3 | 0.4 | 5800 | 0.92 | 166 | A | A |
| Comparative Example 1 | 3 | 0.4 | 23300 | 1.38 | 207 | E | A |
| | 3 | 0.4 | | | | E | A |
| Comparative Example 2 | 0.5 | 0.1 | | | | D | A |

The above-described results have demonstrated that the water purification members of Examples achieve, while suppressing deactivation of nutrient components in the nutrient solution, efficient sterilization and purification of the nutrient solution, compared with the water purification members of Comparative Examples.

This has also demonstrated that the water purification members of Examples achieve, while suppressing insolubilization of organic matter or ions in the aqueous medium, efficient sterilization and purification of the aqueous medium, compared with the water purification members of Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A water purification member comprising:
    a porous body; and
    photocatalyst particles loaded on the porous body and including titanium-based compound particles that have, via an oxygen atom, a surface-bonded metallic compound having a metal atom and a hydrocarbon group, that exhibit absorption at a wavelength of 500 nm in a visible absorption spectrum, and that have an absorption peak in a range of 2700 cm$^{-1}$ to 3000 cm$^{-1}$ in an infrared absorption spectrum.

2. The water purification member according to claim 1, wherein a loading of the photocatalyst particles relative to the water purification member is 1 mass % or more and 60 mass % or less.

3. The water purification member according to claim 2, wherein the loading of the photocatalyst particles relative to the water purification member is 5 mass % or more and 50 mass % or less.

4. The water purification member according to claim 1, wherein the water purification member has a visible-light transmittance of 1% or more and 50% or less.

5. The water purification member according to claim 4, wherein the water purification member has a visible-light transmittance of 2% or more and 40% or less.

6. The water purification member according to claim 1, wherein the water purification member has a liquid absorption of 10 mass % or more and 500 mass % or less.

7. The water purification member according to claim 6, wherein the water purification member has a liquid absorption of 30 mass % or more and 300 mass % or less.

8. The water purification member according to claim 1, wherein the water purification member has a BET specific surface area of 1 $m^2/g$ or more and 300 $m^2/g$ or less.

9. The water purification member according to claim 8, wherein the water purification member has a BET specific surface area of 10 $m^2/g$ or more and 200 $m^2/g$ or less.

10. The water purification member according to claim 1, wherein the porous body is formed of fibers.

11. A hydroponic system comprising:
a container holding a nutrient solution containing nutrients for a plant;
a growing medium member in which the plant grows; and
the water purification member according to claim 1 disposed so as to be in contact with the nutrient solution and exposed to visible light.

12. The hydroponic system according to claim 11, wherein a ratio (photocatalyst particle loading/nutrient solution volume) of a loading (kg) of the photocatalyst particles in the water purification member to a volume (L) of the nutrient solution held in the container is $0.1 \times 10^{-3}$ kg/L or more and $20 \times 10^{-3}$ kg/L or less.

13. The hydroponic system according to claim 12, wherein the ratio (photocatalyst particle loading/nutrient solution volume) of a loading (kg) of the photocatalyst particles in the water purification member to a volume (L) of the nutrient solution held in the container is $0.2 \times 10^{-3}$ kg/L or more and $10 \times 10^{-3}$ kg/L or less.

14. The hydroponic system according to claim 11, wherein a ratio (water-purification-member total surface area/nutrient solution volume) of a total surface area ($m^2$) of the water purification member to a volume (L) of the nutrient solution held in the container is 15 $m^2/L$ or more and 3000 $m^2/L$ or less.

15. The hydroponic system according to claim 14, wherein the ratio (water-purification-member total surface area/nutrient solution volume) of a total surface area ($m^2$) of the water purification member to a volume (L) of the nutrient solution held in the container is 30 $m^2/L$ or more and 1500 $m^2/L$ or less.

16. The hydroponic system according to claim 11, further comprising a circulation device that circulates the nutrient solution held in the container.

17. The hydroponic system according to claim 16, wherein a flow rate of the nutrient solution flowing through the water purification member is calculated to be 500 $L/min/m^3$ or more and 200000 $L/min/m^3$ or less, the flow rate being calculated from a supply amount per unit time (L/min) of the nutrient solution supplied by the circulation device to the container, and a volume ($m^3$) of the water purification member.

18. The hydroponic system according to claim 17, wherein the flow rate of the nutrient solution flowing through the water purification member is calculated to be 1000 $L/min/m^3$ or more and 100000 $L/min/m^3$ or less, the flow rate being calculated from a supply amount per unit time (L/min) of the nutrient solution supplied by the circulation device to the container, and a volume ($m^3$) of the water purification member.

19. The hydroponic system according to claim 11, wherein the water purification member is disposed within the container such that all or a portion of the water purification member is not overlapped by the growing medium member when viewed in a depth direction of the container.

20. The hydroponic system according to claim 11, wherein the water purification member is disposed within the container such that all or a portion of the water purification member is overlapped by the growing medium member when viewed in a depth direction of the container, and
the growing medium member transmits visible light.

21. The hydroponic system according to claim 11, further comprising a light radiation device that radiates visible light to at least the water purification member.

22. A water purification apparatus comprising:
a container holding an aqueous medium; and
the water purification member according to claim 1 disposed so as to be in contact with the aqueous medium and exposed to visible light.

* * * * *